(12) United States Patent
Gumpesberger et al.

(10) Patent No.: US 8,468,903 B2
(45) Date of Patent: Jun. 25, 2013

(54) VEHICLE TRANSMISSION

(75) Inventors: Michael Gumpesberger, Haid (AT);
Thomas Gaertner, Gunskirchen (AT);
Gerhard Wiesinger, Lenzing (AT);
Friedrich Neuwirth, Pichl bei Wels (AT)

(73) Assignee: BRP Powertrain GmbH & Co. KG, Gunskirchen (AU)

( * ) Notice: Subject to any disclaimer, the term of this patent is extended or adjusted under 35 U.S.C. 154(b) by 335 days.

(21) Appl. No.: 13/017,922

(22) Filed: Jan. 31, 2011

(65) Prior Publication Data

US 2012/0192665 A1 Aug. 2, 2012

(51) Int. Cl.
*F16H 3/38* (2006.01)
*F16H 59/00* (2006.01)
*F16H 61/00* (2006.01)
*F16H 63/00* (2006.01)
*F16D 11/04* (2006.01)
*F16D 11/10* (2006.01)
*F16D 13/22* (2006.01)

(52) U.S. Cl.
USPC .......... 74/339; 74/337.5; 192/69.71; 192/108

(58) Field of Classification Search
USPC .............. 74/333, 335, 337.5, 339; 192/69.62, 192/69.71, 108
See application file for complete search history.

(56) References Cited

U.S. PATENT DOCUMENTS

| | | | |
|---|---|---|---|
| 1,907,619 A * | 5/1933 | Soden-Fraunhofen .... | 192/69.83 |
| 2,049,126 A | 7/1936 | Maybach | |
| 2,068,260 A * | 1/1937 | Biggert, Jr. ................ | 192/56.42 |
| 3,743,067 A * | 7/1973 | Bokovoy ......................... | 192/43 |
| 3,967,711 A * | 7/1976 | Stroezel et al. ............... | 192/108 |
| 6,095,303 A * | 8/2000 | Gutmann et al. .......... | 192/48.91 |
| 6,354,417 B1 * | 3/2002 | Narita et al. ............... | 192/69.71 |
| 7,413,067 B2 | 8/2008 | Tsukada et al. | |
| 7,445,575 B2 | 11/2008 | Capito | |

(Continued)

FOREIGN PATENT DOCUMENTS

| | | |
|---|---|---|
| EP | 1998084 A1 | 12/2008 |
| FR | 908130 A | 4/1946 |
| JP | 52017706 U | 2/1977 |
| JP | 11037173 A | 2/1999 |

OTHER PUBLICATIONS

European Search Report from EP2481958; Jun. 13, 2012; Bourgoin J.

(Continued)

*Primary Examiner* — Troy Chambers
*Assistant Examiner* — Michael Gonzalez
(74) *Attorney, Agent, or Firm* — BCF LLP

(57) ABSTRACT

A shifting sleeve for selectively engaging a transmission gear in a vehicle transmission is provided. The transmission gear has at least one opening defined therein. The shifting sleeve comprises at least one tooth for selectively engaging the at least one opening defined in the transmission gear. The at least one tooth extends from the shifting sleeve body and has a first portion, a second portion and a third portion. The first portion has a top surface disposed at a first height and the second portion has a top surface disposed at a second height, the first height being greater than the second height. The third portion is disposed between the first and second portions, and has a top surface disposed at an angle and extending between the top surfaces of the first and second portions.

19 Claims, 26 Drawing Sheets

U.S. PATENT DOCUMENTS

| | | |
|---|---|---|
| 7,484,611 B2 | 2/2009 | Ooka |
| 7,654,374 B2 * | 2/2010 | Minami ........................ 192/3.56 |
| 7,757,576 B1 * | 7/2010 | Einboeck ......................... 74/335 |
| 2005/0026516 A1 | 2/2005 | Natusume et al. |
| 2007/0089552 A1 * | 4/2007 | Busch et al. .................... 74/333 |

OTHER PUBLICATIONS

English Abstract of JP11037173 retrieved from Espacenet on Dec. 5, 2012.

English Abstract of EP 1998084 retrieved from Espacenet on Dec. 5, 2012.

* cited by examiner

VEHICLE TRANSMISSION

TECHNICAL FIELD

The present invention relates to a shifting sleeve for a vehicle transmission and to a transmission having such a shifting sleeve.

BACKGROUND

Vehicle transmissions typically have multiple gears. For a given speed of rotation of an input shaft of the transmission, each gear when engaged results in a different speed of rotation and/or direction of rotation of an output shaft of the transmission. The gears typically need to be engaged sequentially.

One example of a vehicle transmission has a park position, a reverse position, a neutral position, a high position, and low position. In the park position, the output shaft is locked and cannot rotate. In the reverse position, the output shaft rotates in a direction which results in the vehicle in which the transmission is provided to move in a reverse direction. In the high and low positions, the output shaft rotates in a direction which results in the vehicle in which the transmission is provided to move in a forward direction. In the low position, the output shaft rotates slower than in the high position, however more torque is applied in the low position than in the high position. The operator of the vehicle having the transmission selects the position of the transmission via a gear selector having positions corresponding to each of the positions of the transmission.

One typical shifting pattern, or sequence, in which the gears need to be engaged, of the type of transmission described above is sequentially: park, reverse, neutral, high, and low. Therefore, to get from the park position to the low position, the operator of the vehicle will have to engage the reverse, neutral, and high positions before finally engaging the low position. As would be understood, to get back to the park position from the low position, the positions have to be engaged in the reverse sequence.

In some applications, such as in utility vehicles, the operator of the vehicle often needs to switch between the low position and the reverse position. This would be the case for example when the vehicle is provided with a plow and is therefore being used to plow. As explained above, to change from one of the low and the reverse positions to the other of the low and the reverse positions, the operator needs to first engage the transmission into its neutral and high positions. Transmissions typically require that the gear (or gears) corresponding to the selected transmission position needs to be engaged before the following transmission position in the sequence can be selected. However, when the operator of the vehicle wants to select a position of the transmission, it is not uncommon that the gear (or gears) corresponding to this position are not properly aligned with the engagement mechanism being used to connect it to the output shaft, such as a shifting sleeve. This is sometimes referred to as a dog-on-dog condition. When this occurs, the operator is not capable of positioning the gear selector in the proper position until the gear is properly aligned with the shifting sleeve.

Furthermore, shifting sleeves typically have a set of teeth for engaging with a corresponding set of openings defined in the transmission gears for engaging the shifting sleeve to the transmission gears. To avoid premature wearing of both the teeth of the shifting sleeves and edges of the openings defined in the transmission gears, and to reduce noise from the relative movement of the shifting sleeves and transmission gears, the teeth are shaped to fit as tightly as possible in the openings. However, this requires that a shifting sleeve be almost perfectly aligned with a transmission gear for allowing engagement thereto, which may be difficult when the shifting sleeve and transmission gear rotate at significantly different speeds.

This increases the amount of time necessary to get from one gear position to the other and may cause rattling noise. It can also be somewhat upsetting to the operator to often have difficulty in engaging the gears, especially in the type of application described above where constant transmission position changes are necessary.

Therefore, there is a need for a vehicle transmission which facilitates the engagement of the gears of the transmission.

SUMMARY

Example embodiments of a vehicle transmission according to the present invention ameliorate at least some of the inconveniences present in the prior art.

It is an object of the present invention to provide a shifting sleeve for selectively engaging at least one transmission gear in a vehicle transmission, the at least one transmission gear having at least one opening defined therein. The shifting sleeve comprises a shifting sleeve body having two opposite faces and at least one tooth for selectively engaging the at least one opening defined in the at least one transmission gear. The at least one tooth extends from one of the two faces of the shifting sleeve body and has a first portion, a second portion and a third portion. The first portion of the at least one tooth has a top surface disposed at a first height relative to the one of the two faces, the second portion has a top surface disposed at a second height relative to the one of the two faces, the first height being greater than the second height. The third portion of the at least one tooth is disposed between the first and second portions, and has a top surface disposed at an angle relative to the one of the two faces and extending between the top surface of the first portion and the top surface of the second portion.

In one aspect, the first portion of the at least one tooth is a front portion with respect to a rotation direction of the shifting sleeve, and the second portion of the at least one tooth is a rear portion with respect to the rotation direction.

In an additional aspect, the second height is between 55% and 80% of the first height.

In a further aspect, the at least one opening defined in the at least one transmission gear has a first length, and the front portion of the at least one tooth has a second length, the second length being between 30% and 70% of the first length.

In an additional aspect, the angle between the top surface of the third portion of the at least one tooth and the one of the two faces is between 30° and 60°.

In a further aspect, the top surfaces of the first and second portions of the at least one tooth are generally flat.

In an additional aspect, the top surface of the third portion of the at least one tooth is arcuate.

In a further aspect, the top surfaces of the first and second portions of the at least one tooth extend generally parallel to the one of the two faces.

In an additional aspect, the at least one tooth is integrally formed with the shifting sleeve.

It is another object of the present invention to provide a vehicle transmission comprising a first shaft, at least one first gear connected to the first shaft and rotating therewith, a second shaft disposed parallel to the first shaft, and at least one second gear rotatably connected to the second shaft such that the second shaft can rotate independently of the at least one second gear, the at least one second gear operatively engaging the at least one first gear. The vehicle transmission also comprises at least one shifting sleeve disposed on the second shaft near the at least one first gear, the at least one shifting sleeve being rotatably fixed to the second shaft for rotation therewith, the at least one shifting sleeve being movable axially with respect to the second shaft. The at least one shifting sleeve has a face facing the at least one second gear and at least one tooth for selectively engaging at least one opening defined in the at least one second gear. The at least one tooth extends from the face, and has a first portion, a second portion and a third portion. The first portion of the at least one tooth has a top surface disposed at a first height relative to the face, and the second portion has a top surface disposed at a second height relative to the face, the first height being greater than the second height. The third portion of the at least one tooth is disposed between the first and second portions, and has a top surface disposed at an angle relative to the face and extending between the top surface of the first portion and the top surface of the second portion. The vehicle transmission also comprises a fork rod disposed parallel to the second shaft, and at least one shift fork slidably disposed on the fork rod, the at least one shift fork extending toward the at least one shifting sleeve and engaging the at least one shifting sleeve.

In one aspect, the first shaft is an input shaft, the at least one first gear is at least one input gear, the second shaft is a transmission shaft and the input shaft selectively drives the transmission shaft, and the at least one second gear is at least one transmission gear. The vehicle transmission further comprises an output shaft operatively connected to the transmission shaft, and the transmission shaft drives the output shaft.

In an additional aspect, the first portion of the at least one tooth is a front portion with respect to a rotation direction of the shifting sleeve, and the second portion of the at least one tooth is a rear portion with respect to the rotation direction.

In a further aspect, the second height of the at least one tooth is between 55% and 80% of the first height.

In an additional aspect, the at least one opening defined in the at least one second gear has a first length, the front portion of the at least one tooth has a second length, and the second length is between 30% and 70% of the first length.

In a further aspect, the angle between the top surface of the third portion of the at least one tooth and the face of the shifting sleeve is between 30° and 60°.

In an additional aspect, the top surfaces of the first and second portions of the at least one tooth are generally flat.

In a further aspect, the top surface of the third portion of the at least one tooth is arcuate.

In an additional aspect, the top surfaces of the first and second portions of the at least one tooth extend generally parallel to the face of the shifting sleeve.

In a further aspect, the at least one tooth is integrally formed with the at least one shifting sleeve.

Additional and/or alternative features, aspects, and advantages of embodiments of the vehicle transmission will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
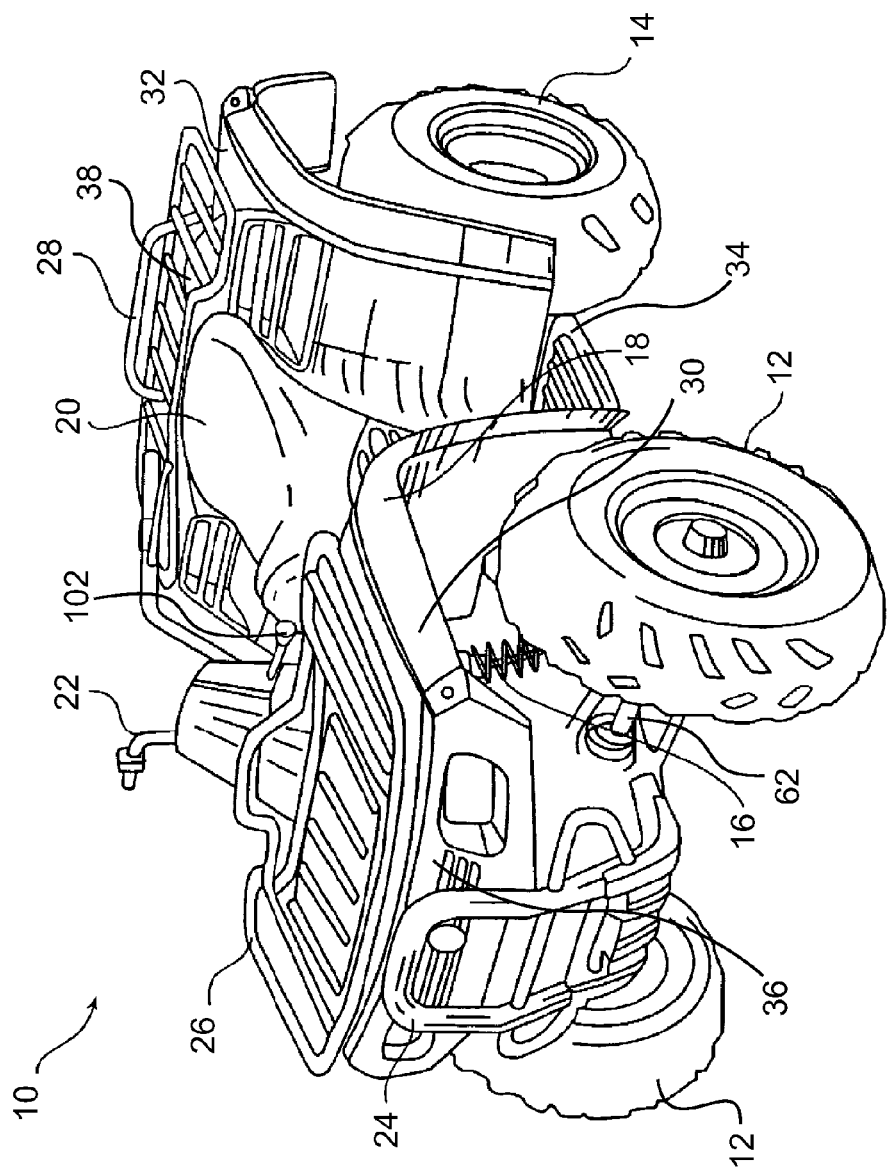
FIG. 1 is a perspective view taken from a front, left side of an all-terrain vehicle (ATV) having an example embodiment of the transmission.

FIG. 1 illustrates an all-terrain vehicle (ATV) 10 provided with an example embodiment of a transmission 100 in accordance with aspects of the invention. It should be understood that the transmission 100 could be used in combination with other types of vehicles, such as, for example, side-by-side off-road vehicles, sometimes referred to as UTVs.

The ATV 10 has two front wheels 12 and two rear wheels 14 operatively mounted to a frame (not shown) of the ATV 10. Each of the wheels 12, 14 is provided with a suspension assembly 16 (only one of which is shown) extending between its corresponding wheel and the frame. A body 18 is mounted to the frame. The ATV 10 has a straddle seat 20 disposed on the body 18 and positioned rearwardly of a handlebar 22. The handlebar 22 forms part of the steering system of the ATV 10 and is operatively connected to the front wheels 12 to transfer steering commands thereto. A gear selector 102, in the form of a hand actuated lever, is mounted near the handlebar 22. It is contemplated that the gear selector 102 could alternatively be a pedal, a finger actuated lever (or levers), or any other suitable type of gear selector. The operator of the ATV 10 uses the gear selector 102 to select a shift position of the transmission 100 as described in greater detail below. The ATV 10 also features a front bumper 24, a front carriage rack 26 and a rear carriage rack 28 disposed over the body 18. The body 18 includes front and rear fenders 30 and 32 respectively. Footrests 34 are disposed on either side of the seat 20 and join the front and rear fenders 30, 32. Fairing elements 36 and 38 cover the front and rear portions of the ATV 10 respectively.

Figure 2:
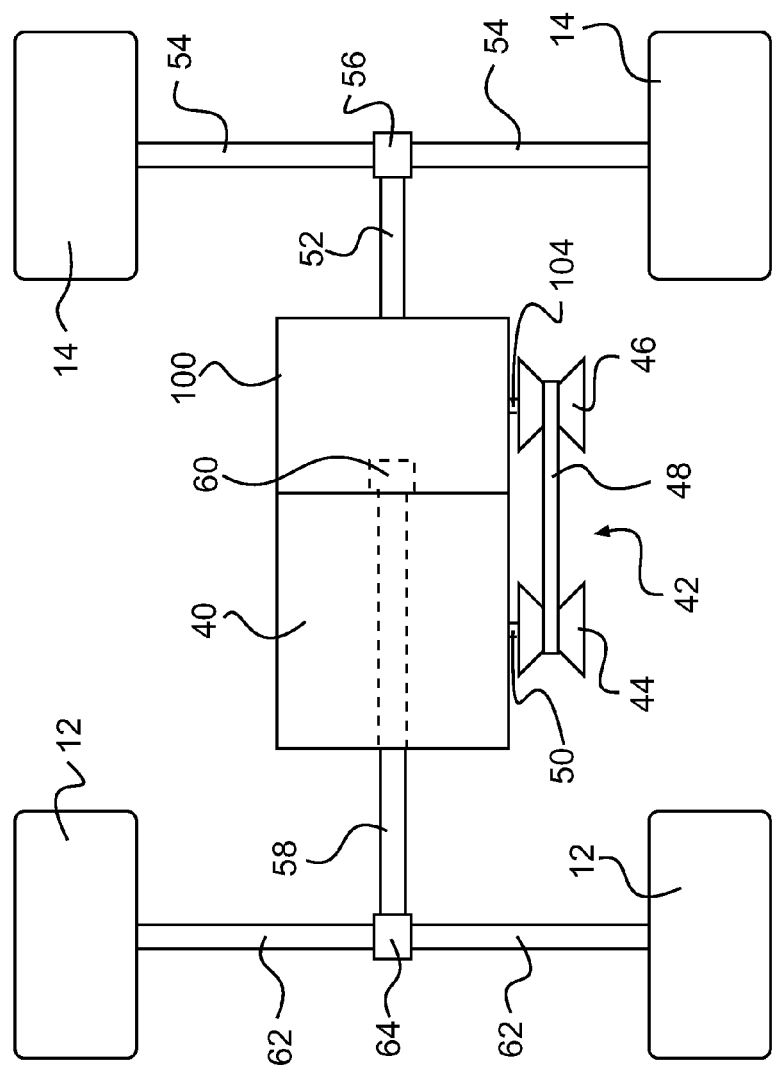
FIG. 2 is a schematic illustration of a top view of a drivetrain of the ATV of FIG. 1.

Turning now to FIG. 2, a drivetrain of the ATV 10 will be described. An engine 40 of the ATV 10 transmits torque to the transmission 100 via a continuously variable transmission (CVT) 42. The CVT 42 includes a driving pulley 44, a driven pulley 46, and a belt 48. The driving pulley 44 is mounted on an output shaft 50 of the engine 40. The driven pulley 46 is mounted on an input shaft 104 of the transmission 100. The belt 48 transmits torque from the driving pulley 44 to the driven pulley 46. An output shaft 106 (not shown in FIG. 2, but shown in FIG. 5) of the transmission 100 is operatively connected to the wheels 12, 14 as described below to transmit torque from the engine 40 to the wheels 12, 14. The output shaft 106 is connected to a rear driveshaft 52. The rear driveshaft 52 is connected to rear axles 54 via a rear differential 56. The rear axles 54 are connected to the rear wheels 14. The output shaft 106 is selectively connected to a front driveshaft 58 via a clutch 60. The clutch 60 can be operated by the operator of the ATV 10 to select between an all-wheel drive mode (i.e. with wheels 12 and 14 driven by the engine 40) and a two-wheel drive mode (i.e. with only the rear wheels 14 driven by the engine 40). The front driveshaft 58 passes through the engine 40. The front driveshaft 58 is connected to front axles 62 via a front differential 64. The front axles 64 are connected to the front wheels 12.

Figure 3:
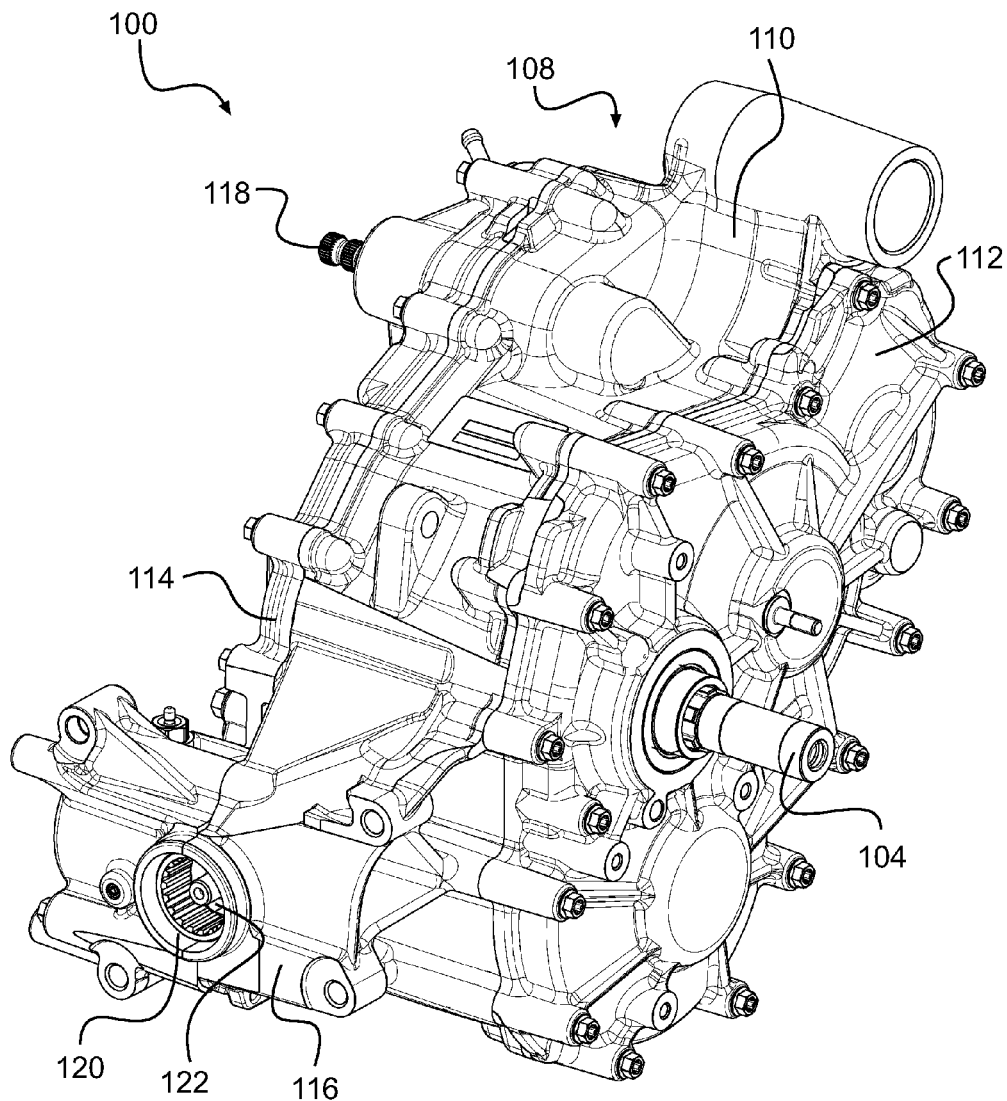
FIG. 3 is a perspective view taken from a top, front, left side of the example embodiment of the transmission of the ATV of FIG. 1.
Figure 4:
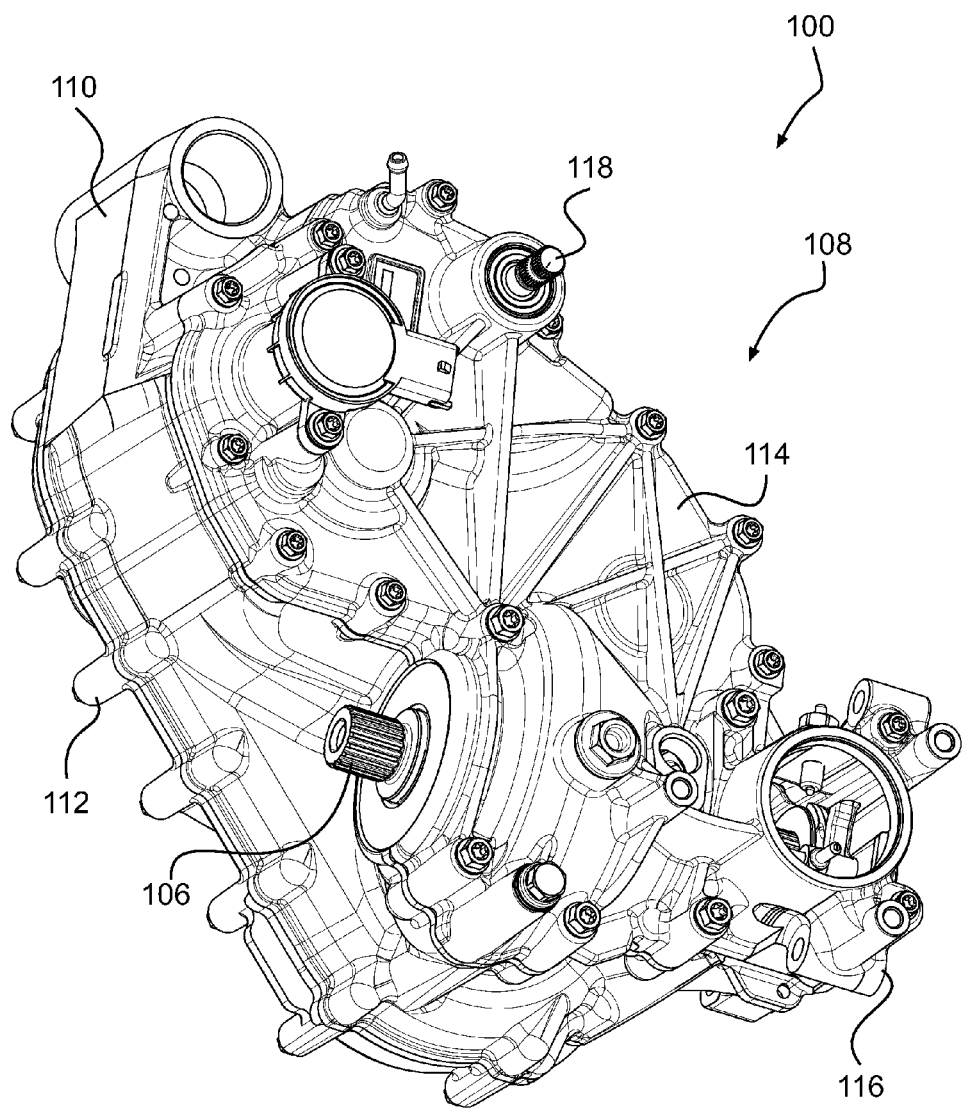
FIG. 4 is a perspective view taken from a bottom, rear, right side of the transmission of FIG. 3.

Turning now to FIGS. 3 to 8, the transmission 100 will be described in more detail. As seen in FIGS. 3 and 4, the transmission 100 has a housing 108. The housing 108 is made of a central housing portion 110 and two side covers 112, 114. As can be seen, the side covers 112, 114 are fastened to the central housing portion 110 by a plurality of bolts. The housing 108 forms a mounting plate 116 for mounting the transmission 100 to the engine 40. The input shaft 104 of the transmission 100 extends through the side cover 112 such that the driven pulley 46 can be mounted thereon. A shift shaft 118 of the transmission 100 extends through the side cover 114. The end of the shift shaft 118 which extends out of the housing 108 is splined so as to be operatively connected to the gear selector 102. When the operator of the ATV 10 moves the gear selector 102, the shift shaft 118 rotates. The front end of the output shaft 106 is disposed in an opening 120 at the front of the housing 108. The front end of the output shaft 106 is connected to an internally splined sleeve 122 used to operatively connect to the front driveshaft 58. The rear end of the output shaft 106 extends through the rear of the housing 108. The rear end of the output shaft 106 which extends out of the housing 108 is splined to operatively connect to the rear driveshaft 52. As can be seen, the output shaft 106 is disposed perpendicularly to the input shaft 104. It is contemplated that the output shaft 106 could alternatively be disposed parallel to the input shaft 104 to accommodate a drivetrain layout which is different from the one shown in FIG. 2.

Figure 5:
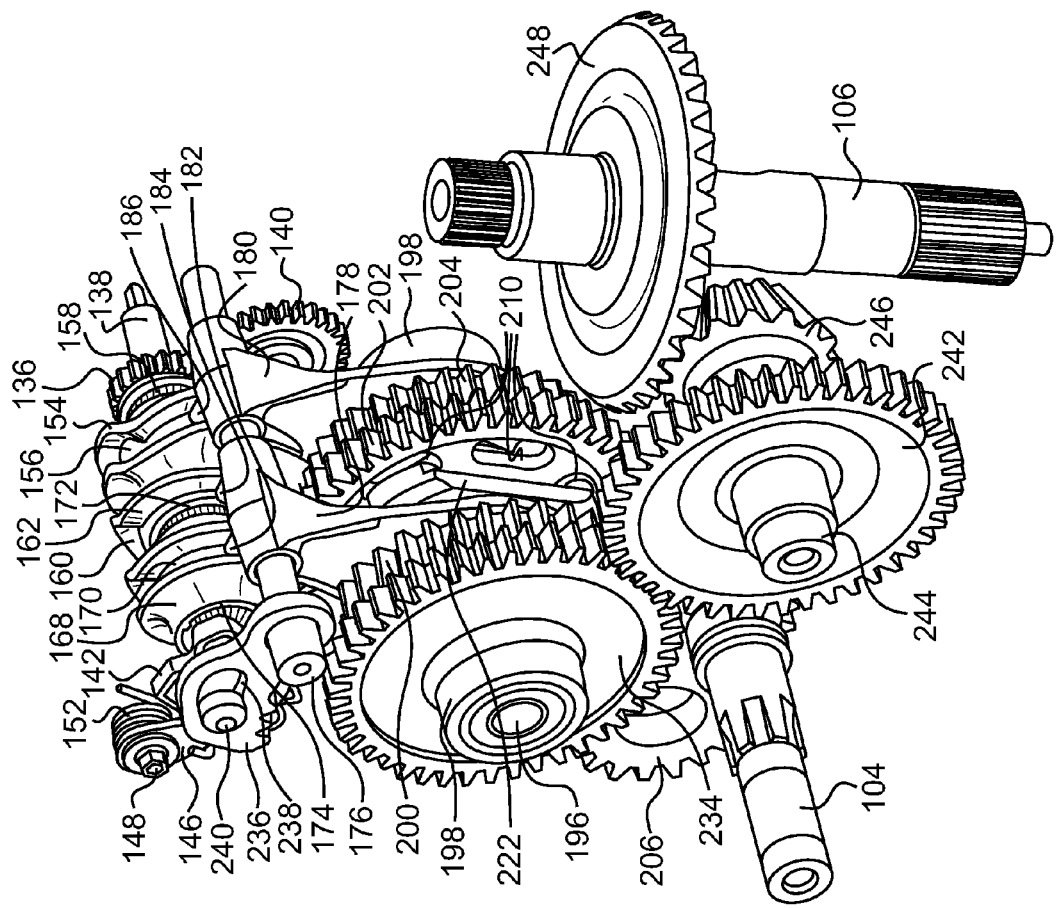
FIG. 5 is a perspective view taken from a bottom, rear, left side of internal components of the transmission of FIG. 3 with some elements of the transmission removed for clarity.
Figure 6:
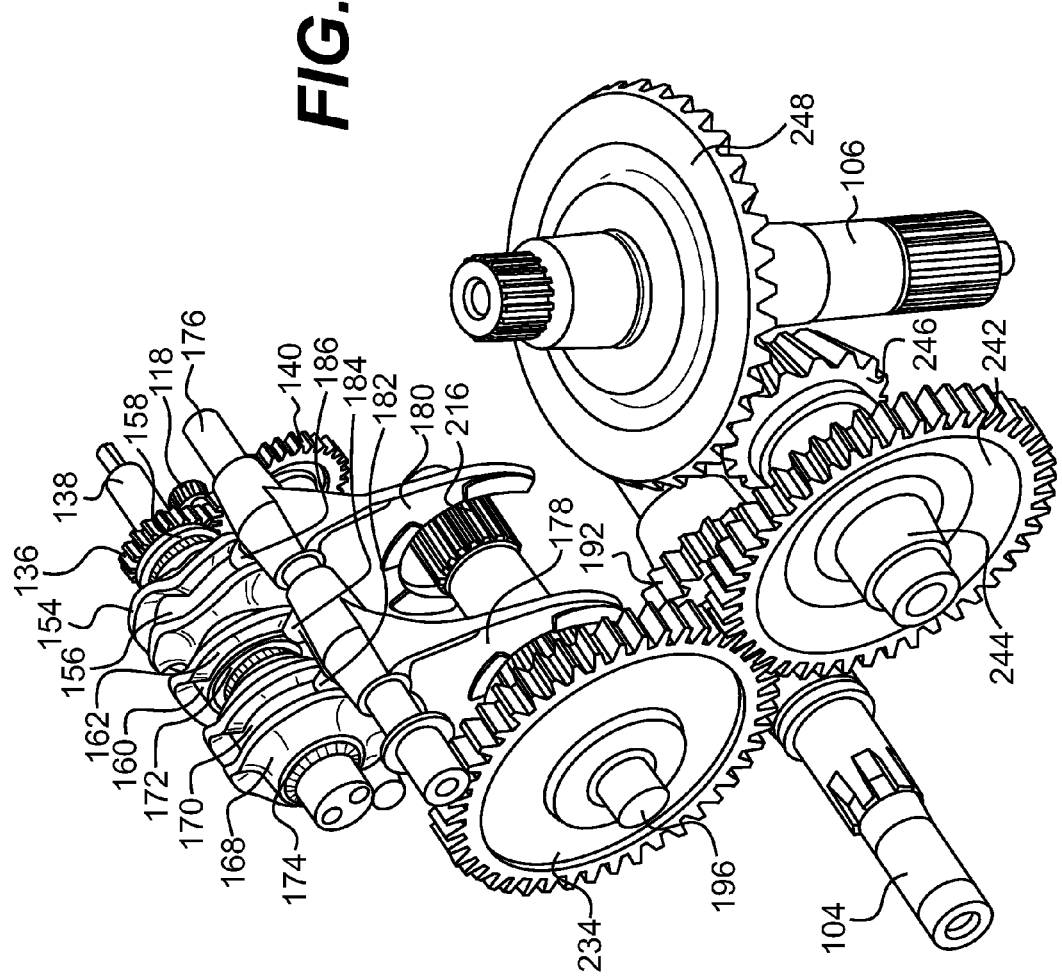
FIG. 6 is another perspective view taken from a bottom, rear, left side of the internal components of the transmission of FIG. 5 with additional elements of the transmission removed for clarity.
Figure 7:
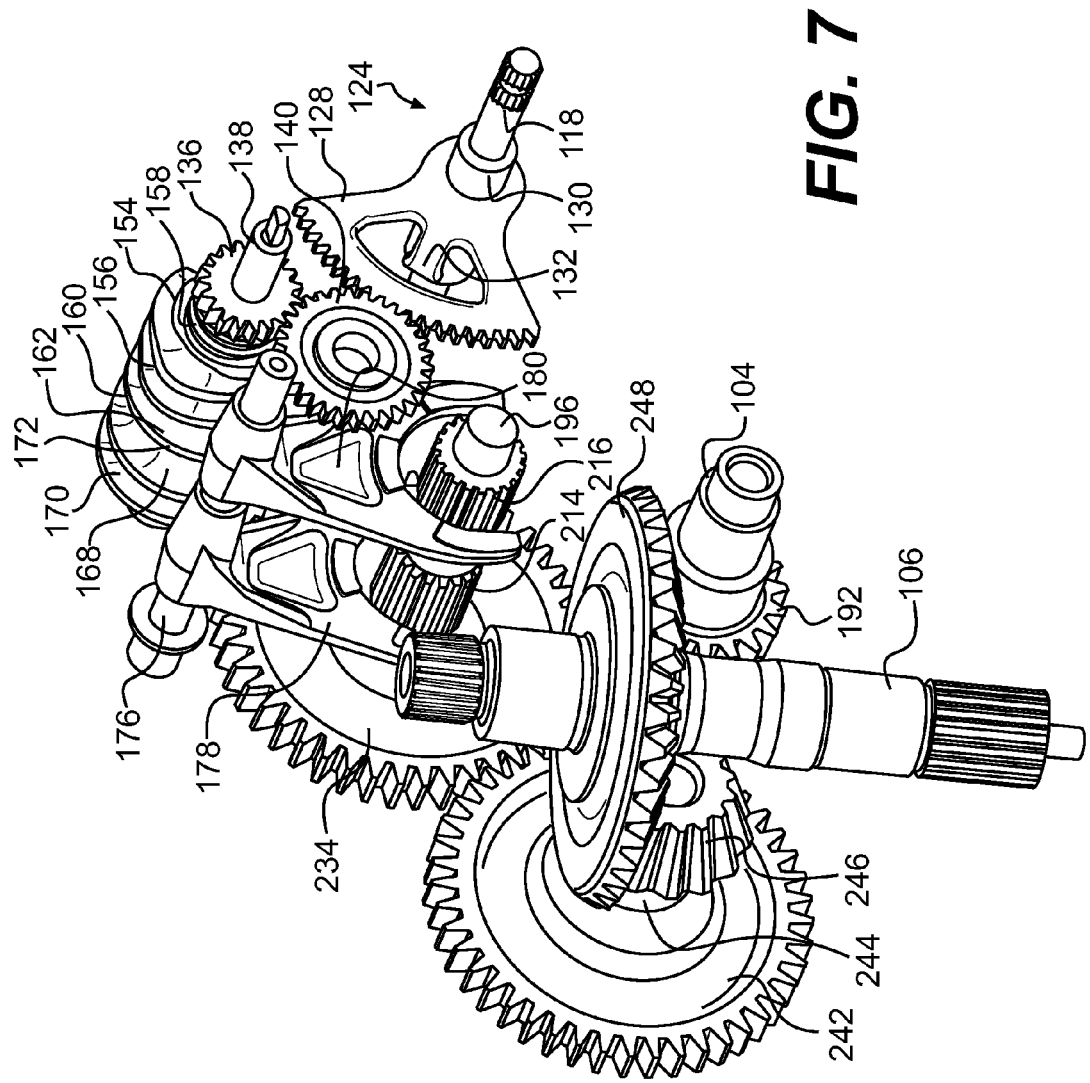
FIG. 7 is a is a perspective view taken from a bottom, rear, right side of the internal components of the transmission of FIG. 6.
Figure 8:
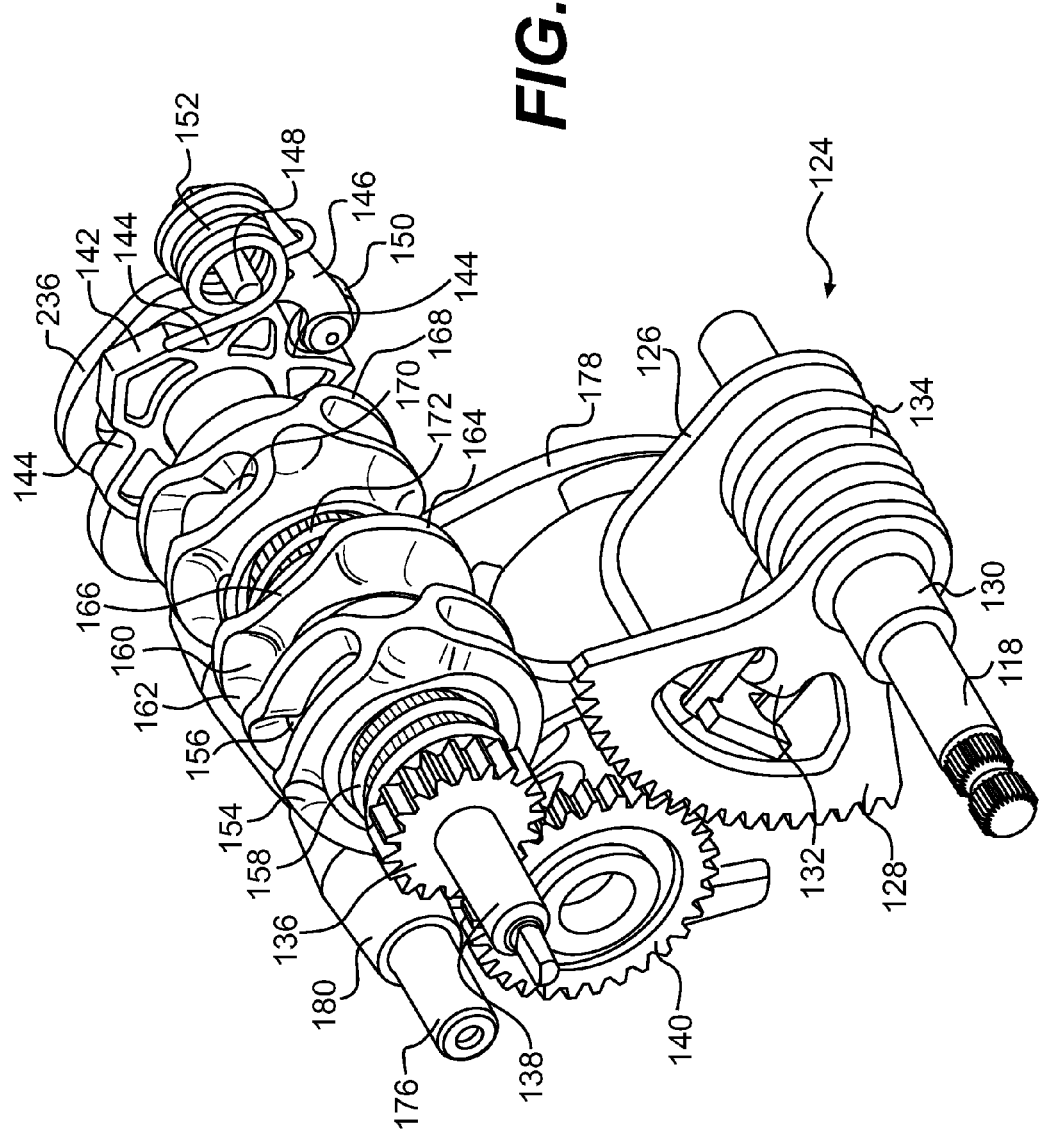
FIG. 8 is a is perspective view taken from a top, front, right side of a shifting mechanism of the transmission of FIG. 3.

Turning now to FIGS. 5 to 9A, the internal components of the transmission 100 will be described. As best seen in FIGS. 7 and 8, a shifting assembly 124 is mounted on the shift shaft 118. The shifting assembly 124 includes a lever 126 fixedly connected to the shift shaft 118 that rotates in unison therewith. The lever 126 has a first portion extending perpendicular to the shift shaft 118 and a second portion extending parallel to the shift shaft 118. The end of the second portion of the lever 126 includes a pair of recesses. A segment gear 128 having a sleeve portion 130 is rotatably mounted on the shift shaft 118. The segment gear 128 has a seat 132 projecting from an edge of an opening in the segment gear 128 and extending parallel to sleeve portion 130. The shifting assembly 124 also includes a torsion spring 134 installed onto the sleeve portion 130 of the segment gear 128. The extremities of the spring 134 are bent so as to be received in the pair of recesses of the lever 126 and to abut either sides of the seat 132 as shown. A more detailed description of a shifting assembly of the type of the shifting assembly 124 is provided in U.S. Pat. No. 7,617,904, issued Nov. 17, 2009, the entirety of which is incorporated herein by reference.

The rotational movement of the shifting shaft 118 imparted by the gear selector 102 is thus transferred to the segment gear 128 through the torsion spring 134. The segment gear 128 engages a drive gear 136 disposed on a shift drum shaft 138 via a gear 140 disposed on a shaft (not shown). As can be seen, the shift drum shaft 138 and the shift shaft 118 are parallel to each other. During operation of the ATV 10, it is possible that the gear 140 may be difficult to rotate due to difficulties in engaging the gears of the transmission as described below. When the operator wants to change shift position by moving the gear selector 102 and this occurs, the shift shaft 118 rotates and the energy received through the gear selector 102 is stored temporarily in the torsion spring 134 while the segment gear 128 remains stationary or rotates less than the shifting shaft 118 due to the difficult in rotating the gear 140. The energy stored in the torsion spring 134 is released when the situation which made engagement of the gears of the transmission 100 difficult to effect is eliminated. When the energy stored in the torsion spring 134 is released, the segment gear 128 rotates the gear 140, and thereby effects the desired change in shifting position.

Figure 14:
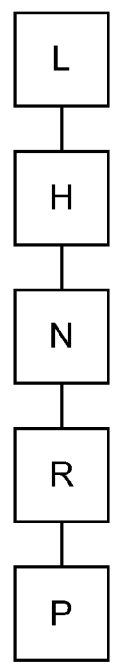
FIG. 14 is diagram illustrating a shifting sequence of the transmission of FIG. 3.

As best seen in FIG. 8, an indexing wheel 142 is connected to the shift drum shaft 138. The indexing wheel 142 rotates with the shift drum shaft 138. The indexing wheel 142 defines a plurality of recesses 144 each corresponding to a shifting position of the transmission 100. The vehicle transmission 100 has five shifting positions. As can be seen in FIG. 14, these positions are sequentially: park (P), reverse (R), neutral (N), high (H), and low (L). It is contemplated that the shifting sequence could be different. For example, the shifting sequence could be park, reverse, neutral, low, and high. Accordingly, the indexing wheel 142 has five recesses 144. It is contemplated that the vehicle transmission 100 could have more or less shifting positions, and as a result, the indexing wheel 142 would have a corresponding number of recesses 144. An indexing lever 146 is rotatably disposed on a shaft 148. A roller 150 is provided at one end of the indexing lever 146. A spring 152 biases the end of the indexing lever 146 having the roller 150 toward the indexing wheel 142 such that the roller 150 is in contact with the indexing wheel 142. The indexing wheel 142 and indexing lever 146 help ensure that the shift drum shaft 138 is in the angular position corresponding to the shifting position selected by the operator of the ATV 10 via the gear selector 102. The indexing wheel 142 and indexing lever 146 also provide some resistance to changes in shifting position, thus helping to prevent undesired changes in shifting position, and assist in selecting the desired shifting position once the shifting drum shaft 138 has been rotated by a certain amount (i.e. once the roller 150 passes over a tip of the indexing wheel 142).

As is also best seen in FIG. 8, a portion of the shift drum shaft 138 between the drive gear 136 and the indexing wheel 142 is splined. An internally splined shift drum 154 is disposed on the splined portion of the shift drum shaft 138. As such, the shift drum 154 is rotatably fixed to the shift drum shaft 138 and rotates therewith. The shift drum 154 can also move axially along the shift drum shaft 138 for reasons described below. The shift drum 154 defines a groove 156 shaped to effect the desired shifting sequence of the vehicle transmission 100 as described in greater detail below. A coil spring 158 is disposed around the shift drum shaft 138 between the drive gear 136 and the shift drum 154. It is contemplated that other types of springs could be used. The coil spring 158 biases the shift drum 154 away from the drive gear 136 into contact with a collar 160. This position of the shift drum 154 will be referred to herein as the default position of the shift drum 154.

The collar 160 is rotatably and axially fixed to the shift drum shaft 138. The collar 160 defines a radially extending wall 162 having a straight portion 164 and a recessed portion 166.

Figure 9A:
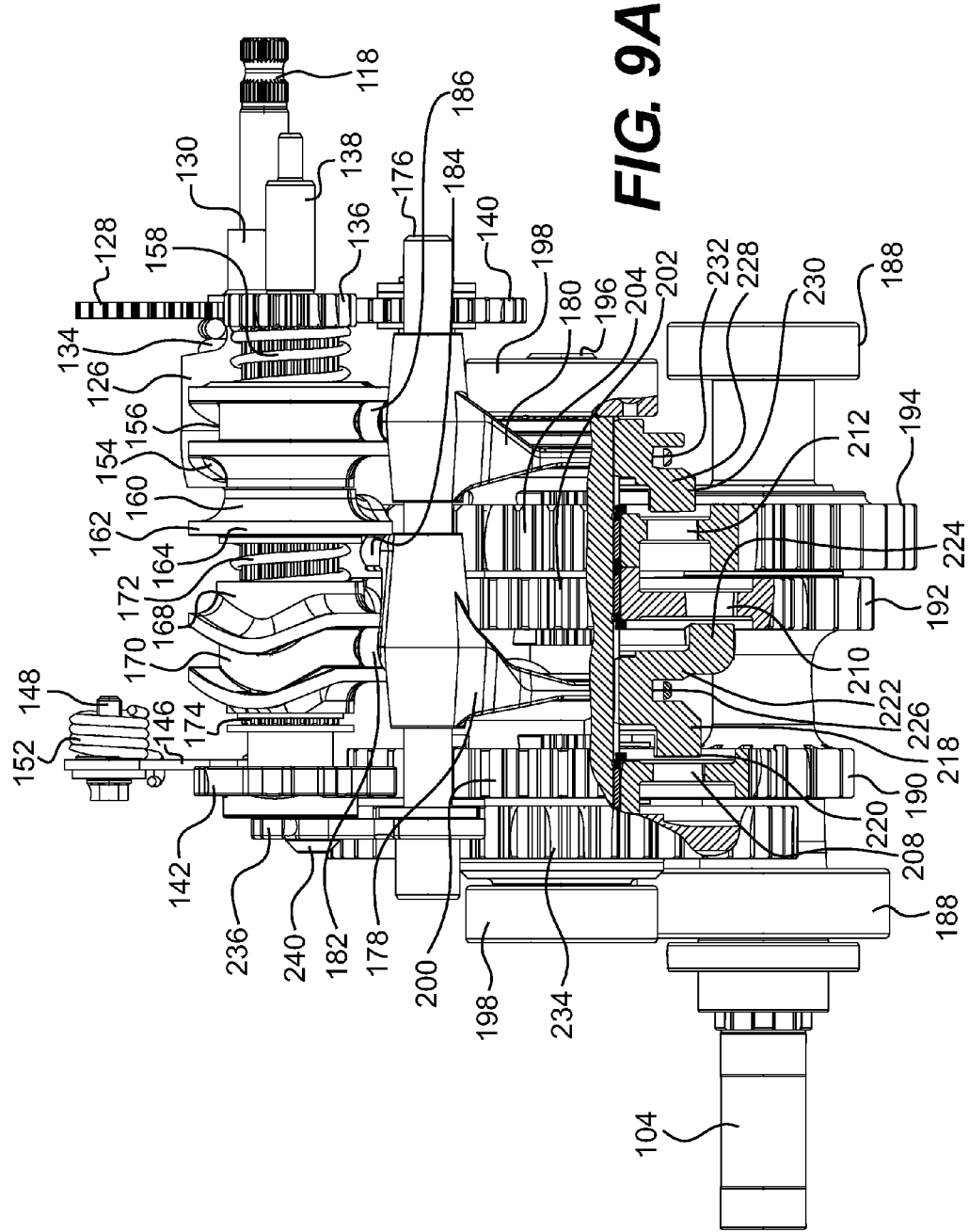
FIG. 9A is a rear perspective view of internal components of the transmission of FIG. 3 in a park position, with a portion thereof shown in cross-section.

Another internally splined shift drum 168 is disposed on the splined portion of the shift drum shaft 138 such that the collar 160 is disposed between the shift drums 154 and 168. As such, the shift drum 168 is rotatably fixed to the shift drum shaft 138 and rotates therewith. The shift drum 168 can also move axially along the shift drum shaft 138 for reasons described below. The shift drum 168 defines a groove 170 shaped to effect the desired shifting sequence of the vehicle transmission 100 as described in greater detail below. A coil spring 172 is disposed around the shift drum shaft 138 between the collar 160 and the shift drum 168. It is contemplated that the coil spring 172 could be disposed on the other side of the shift drum 168. It is also contemplated that other types of springs could be used. The coil spring 172 biases the shift drum 154 away from the collar 160 into contact with a stopper ring 174 (FIG. 9A). This position of the shift drum 168 will be referred to herein as the default position of the shift drum 168.

Turning now to FIGS. 5 to 7, a fork rod 176 is disposed parallel to the shift drum shaft 138. Two shift forks 178, 180 are slidably disposed on the fork rod 176. The shift fork 178 has a pin 182 received in the groove 170 of the shift drum 168 such that as the shift drum 168 rotates the pin 182 follows the groove 170 and causes the shift fork 178 to slide along the fork rod 176. The shift fork 178 has another pin 184 selectively abutting the radially extending wall 162 of the collar 160. The shift fork 180 has a pin 186 received in the groove 156 of the shift drum 154 such that as the shift drum 154 rotates the pin 186 follows the groove 156 and causes the shift fork 180 to slide along the fork rod 176.

Turning now to FIG. 9A, the input shaft 104 is rotatably supported inside the housing 108 by two bearings 188. The input shaft 104 is parallel to the fork rod 176. Three input gears 190, 192, 194 are connected to the input shaft 104 and rotate therewith. As can be seen the input gears 190, 192, 194 have different diameters, with input gear 190 having the smallest of the three diameters and input gear 194 having the largest of the three diameters. As can also be seen, the input gear 192 is disposed between the input gears 190 and 194, is spaced from the input gear 190 and is disposed next to the input gear 194.

As seen in FIG. 5, a transmission shaft 196 is rotatably supported inside the housing 108 by two bearings 198. The transmission shaft 196 is parallel to the input shaft 104. Three transmission gears 200, 202, 204 are rotatably connected to the transmission shaft 196 such that the transmission gears 200, 202, 204 can rotate independently of the transmission shaft 196. For example, in the park and neutral shifting positions described below, while the engine 40 is running and the input shaft 104 is therefore rotating, the transmission gears 200, 202, 204 rotate even though the transmission shaft 196 is not rotating. As can also be seen, the transmission gear 202 is disposed between the transmission gears 200 and 204, is spaced from the transmission gear 200 and is disposed next to the transmission gear 204. The transmission gear 202 engages and is driven by the input gear 192. The transmission gear 204 engages and is driven by the input gear 194. The transmission gear 200 engages and is driven by an idler gear 206. The idler gear 206 is disposed on a shaft (not shown) which is parallel to the input and transmission shafts 104, 196. The idler gear 206 engages and is driven by the input gear 190. Therefore, the transmission gear 200 rotates in a direction opposite a direction of rotation of the transmission gears 202, 204. A diameter of the transmission gear 202 is larger than the diameter of the transmission gear 204. Therefore the gear ratio of the gears 192 and 202 versus the gear ratio of the gears 194 and 204 is such that the speed of rotation of the transmission gear 204 is greater than the speed of rotation of the transmission gear 202. Referring to FIG. 9A, the transmission gear 200 has a set of openings 208, the transmission gear 202 has a set of openings 210, and the transmission gear 204 has a set of openings 212. The openings 208, 210, 212 are arranged in a circular pattern radially inwardly of an outer periphery of their respective transmission gears 200, 202, 204.

As best seen in FIG. 7, the transmission shaft 196 has splined portions 214, 216. The splined portion 214 is disposed between the transmission gears 200 and 202. The splined portion 216 is disposed next to the transmission gear 204. Turning now to FIG. 9A, a shifting sleeve 218 is disposed between the transmission gears 200 and 202. The shifting sleeve 218 engages the splined portion 214 so as to be rotatably fixed to the transmission shaft 196 and axially movable with respect to the transmission shaft 196. The shifting sleeve 218 has set of teeth 220 selectively engaging the set of openings 208 of the transmission gear 200. A shifting sleeve 222 is disposed between the shifting sleeve 218 and the transmission gear 202. The shifting sleeve 222 engages the splined portion 214 so as to be rotatably fixed to the transmission shaft 196 and axially movable with respect to the transmission shaft 196. The shifting sleeve 222 has set of teeth 224 for selectively engaging the set of openings 210 of the transmission gear 202. The shifting sleeves 218 and 222 are integrally formed, however it is contemplated that the shifting sleeves 218 and 222 could be separate parts. The shift fork 178 is received in a groove 226 formed between the shifting sleeves 218 and 222. A shifting sleeve 228 is disposed on the splined portion 216 such that the transmission gears 202, 204 are disposed between the shifting sleeve 222 and 228. The shifting sleeve 228 engages the splined portion 216 so as to be rotatably fixed to the transmission shaft 196 and axially movable with respect to the transmission shaft 196. The shifting sleeve 228 has set of teeth 230 for selectively engaging the set of openings 212 of the transmission gear 204. The shift fork 180 is received in a groove 232 formed in the shifting sleeve 228.

By sliding the shift forks 178, 180 along the fork rod 176, as described in greater detail below, the transmission gears 200, 202, 204 can be engaged by their corresponding shifting sleeves 218, 222, 228 respectively. Only one of the transmission gears 200, 202, 204 can be engaged at a time. When one of the transmission gears 200, 202, 204 is engaged by its corresponding shifting sleeve 218, 222, or 228, the rotational motion of the engaged transmission gear 200, 202 or 204 is transferred to the transmission shaft 196 by the corresponding shifting sleeve 218, 222, or 228 and the transmission shaft 196 rotates at the same speed and in the same direction as the engaged transmission gear 200, 202 or 204.

Figure 9B:
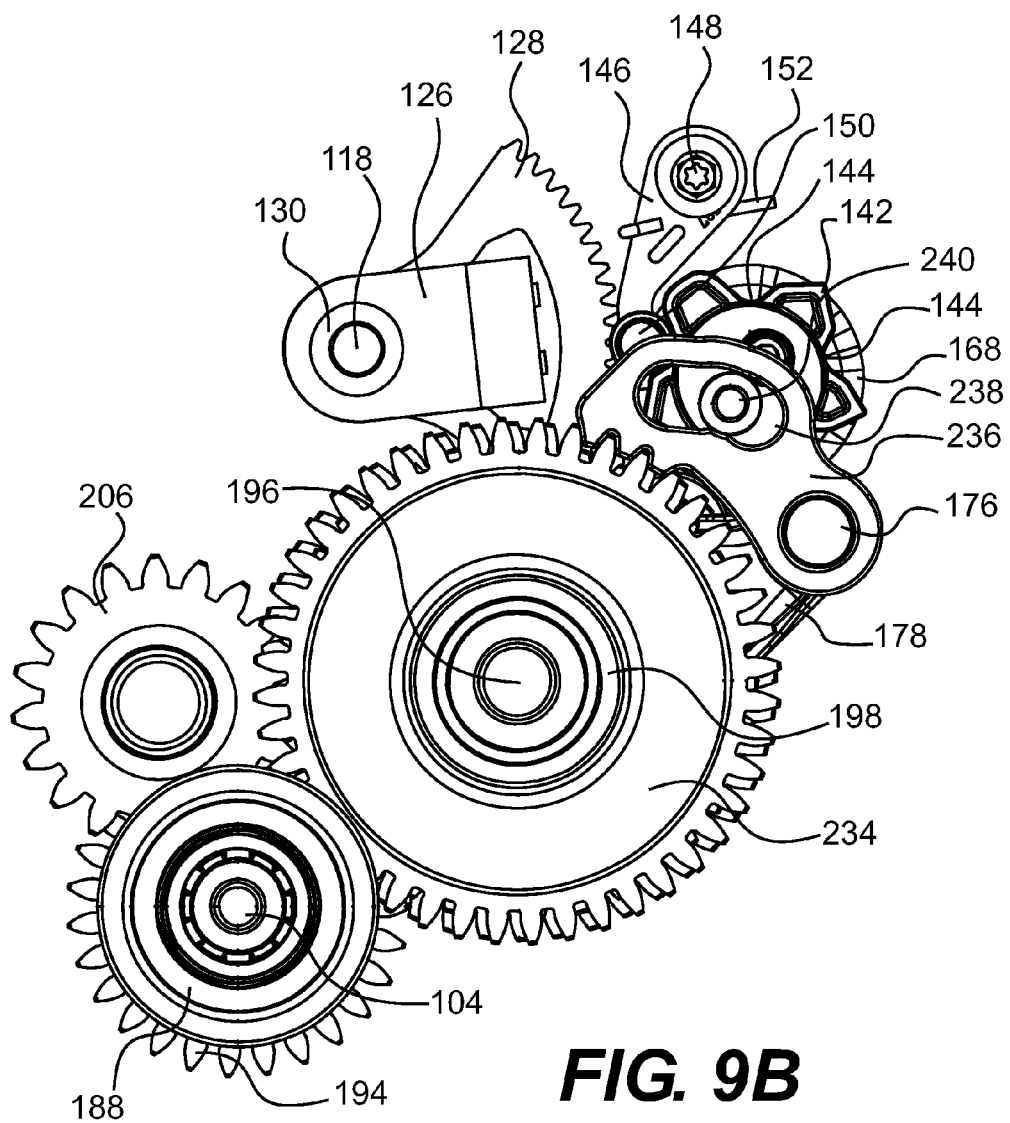
FIG. 9B is a left side elevation view of FIG. 9A.

As best seen in FIG. 5, another transmission gear 234 is fixedly connected to the transmission shaft 196 for rotation therewith. The transmission gear 234 is disposed between one of the bearings 198 and the transmission gear 200. The transmission gear 234 is selectively engaged by a parking lock lever 236. When the parking lock lever 236 engages the transmission gear 234 as shown in FIG. 9B, the transmission gear 234 and the transmission shaft 196 are prevented from rotating. The parking lock lever 236 is rotatably disposed on the fork rod 176. The parking lock lever 236 has an opening 238 defined therein. An eccentric 240 is connected to an end of the shift drum shaft 138. The eccentric 240 is received inside the opening 238 of the parking lock lever 236. As the shift drum shaft 138 is rotated, the eccentric 240 moves the parking lock lever 236 from the position where the parking lock lever 236 engages the transmission gear 234 to a plurality of positions where the parking lock lever 236 is disengaged from the transmission gear 234.

As seen in FIGS. 5 to 7, the transmission gear 234 engages an intermediate gear 242 connected to an intermediate shaft 244 and rotating therewith. The intermediate shaft 244 is parallel to the input shaft 104. A bevel gear 246 is connected to the intermediate shaft 244 and rotates therewith. The bevel gear 246 engages a bevel gear 248 connected to the output shaft 106 and rotating therewith. When the transmission shaft 196 rotates, the transmission gear 234 drives the intermediate gear 242 which causes the bevel gear 246 to drive the bevel gear 248, and therefore the output shaft 106. It is contemplated that the output shaft 106 could be disposed parallel to the intermediate shaft 244 by replacing the bevel gears 246, 248 by spur gears. It is also contemplated that the intermediate shaft 244 and gears 242 and 246 could be omitted and that the output shaft 106 could be driven directly from the transmission shaft 196. In such an embodiment the transmission gear 234 would be replaced by a bevel gear to engage the bevel gear 248. Alternatively, the output shaft 106 could be oriented parallel to the transmission shaft 196 and the bevel gear 248 would be replaced by a spur gear to engage the transmission gear 234. It is also contemplated that other types of gearing arrangements could be used to drive the output shaft 106 from the transmission shaft 196.

Turing now to FIGS. 15A to 18B, the shape of the teeth 230 of the shifting sleeve 228 will be described. The teeth 220 and 224 of the shifting sleeves 218 and 222 are similar to the teeth 230 of the shifting sleeve 228 and will therefore not be described in detail herein.

Figure 15A:
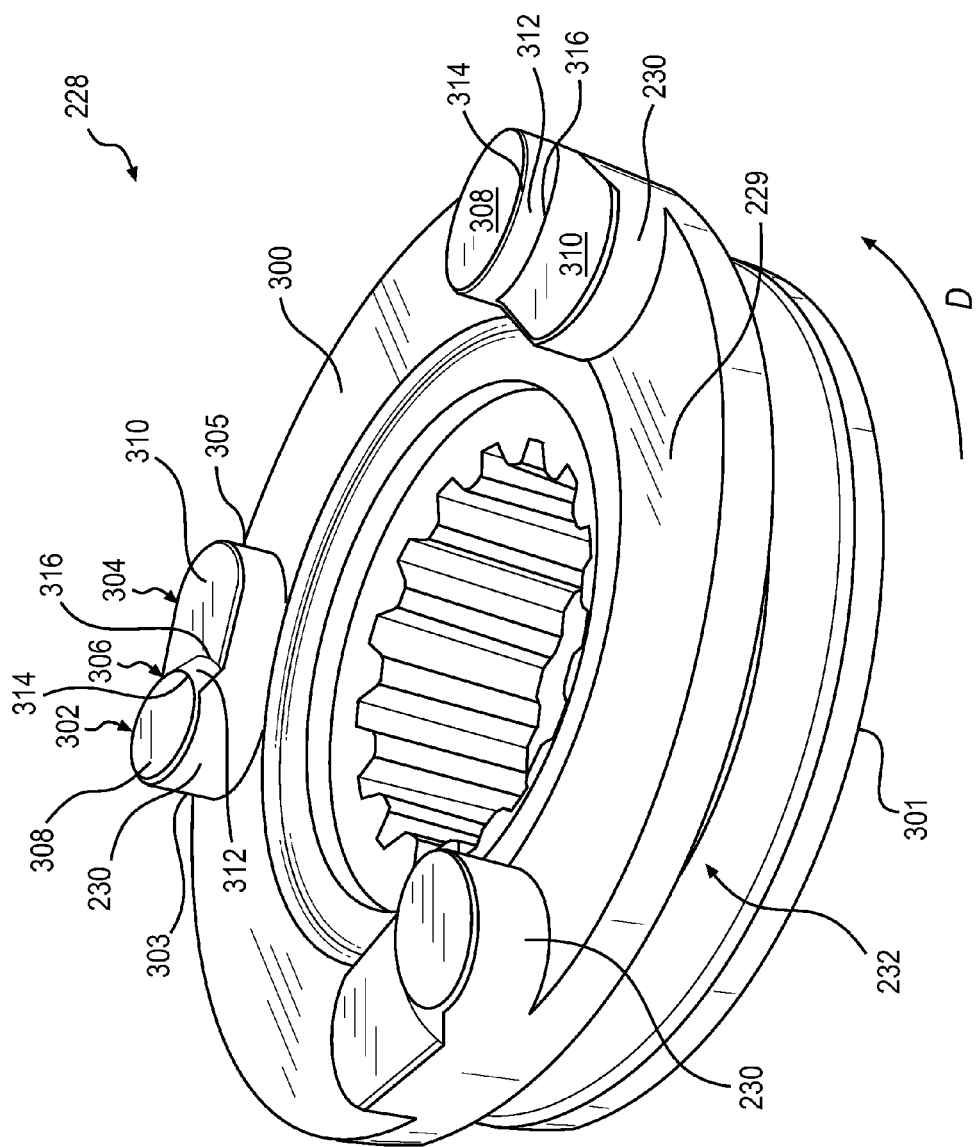
FIG. 15A is a perspective view of a shifting sleeve of the transmission of FIG. 3.

As shown in FIG. 15A, the shifting sleeve 228 has a shifting sleeve body 229 having a first face 300 facing the transmission gear 204 (shown in FIG. 16), a second face 301, and the groove 232 for receiving the shift fork 180. Three teeth 230 are integrally formed with the shifting sleeve body 229 and extend from the first face 300. The three teeth 230 are equally space around the shifting sleeve body 229. It is contemplated that a different number of teeth 230 could be provided. The teeth 230 are shaped and disposed on the first face 300 so as to engage the set of openings 212 of the transmission gear 204 (shown in FIG. 16).

Figure 15B:
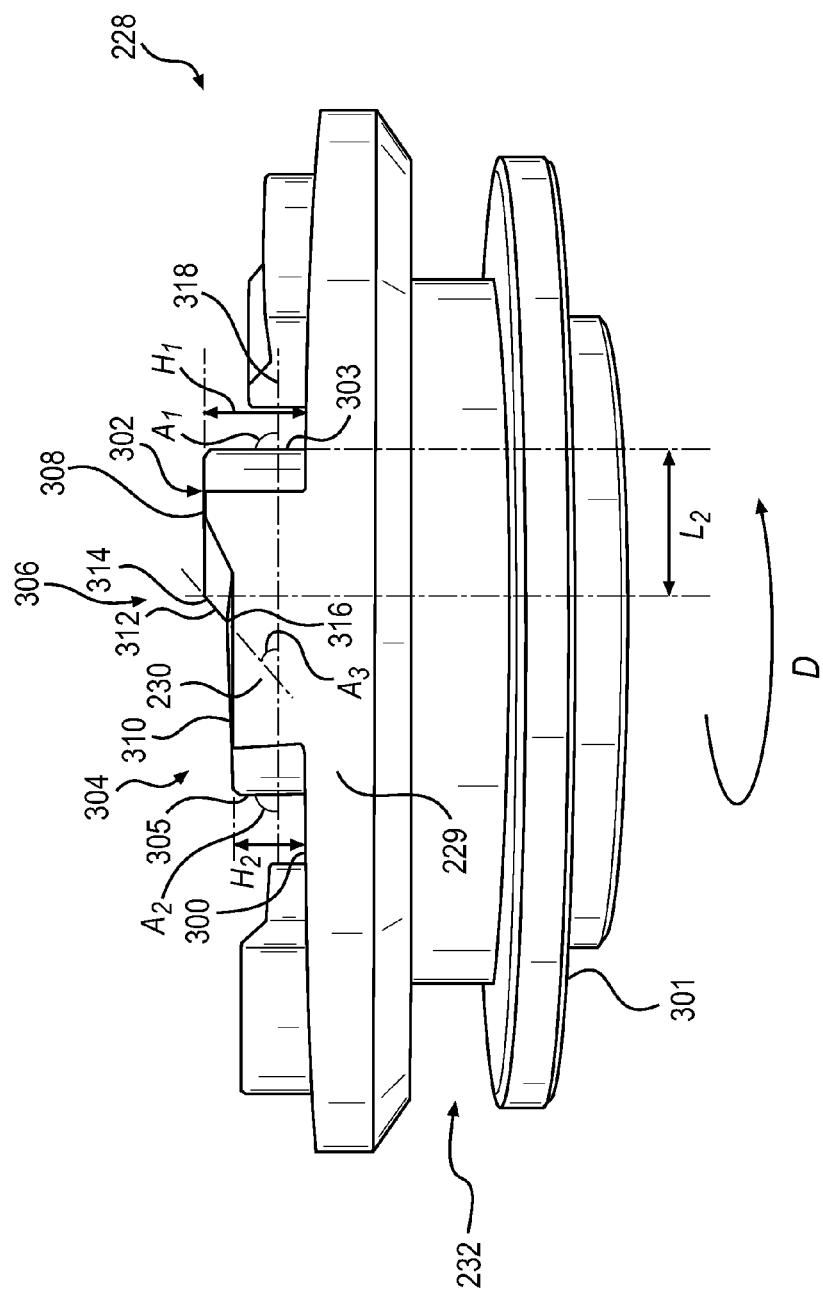
FIG. 15B is a side elevation view of the shifting sleeve of FIG. 15A.

As shown in FIGS. 15A and 15B, the shifting sleeve 228 has a rotation direction D, and each tooth 230 has a front face 303 and a rear face 305 consistent with the rotation direction D. The front face 303 defines an angle $A_1$ with respect to a line 318 extending parallel to the first face 300. In this embodiment, the angle $A_1$ is 88°. It is contemplated that in other embodiments, the angle $A_1$ could be between 85° and 90°. The rear face 305 also defines angle $A_2$ with respect to the line 318. In this embodiment, the angle $A_2$ is 88°. It is contemplated that in other embodiments, the angle $A_2$ could be between 85° and 90°.

Each tooth 230 has a front portion 302 and a rear portion 304 consistent with the rotation direction D. Each tooth 230 also has an intermediate portion 306 disposed between the front portion 302 and the rear portion 304. The front portion 302 has a flat top surface 308, the rear portion 304 has a flat top surface 310, and the intermediate portion 306 has an arcuate surface 312. The top surfaces 308, 310 and 312 have chamfered edges.

The front portion 302 has a first height $H_1$ measured between the top surface 308 and the first face 300. In this embodiment, the first height $H_1$ is approximately 5.5 millimetres (mm). The rear portion 304 has a second height $H_2$ measured between the top surface 310 and the first face 300. In this embodiment, the second height $H_2$ is approximately 1.5 mm. It is contemplated that in other embodiments, the second height $H_2$ could be between 55% and 80% of the first height $H_1$.

The top surface 312 of the intermediate portion 306 has a first end 314 adjacent the top surface 308 of the front portion 302, and a second end 316 adjacent the top surface 310 of the rear portion 304. The top surface 312 defines an angle $A_3$ with respect to the line 318. In this embodiment, the angle $A_3$ is 45°. It is contemplated that in other embodiments, the angle $A_3$ could be between 30° and 60°.

Figure 16:
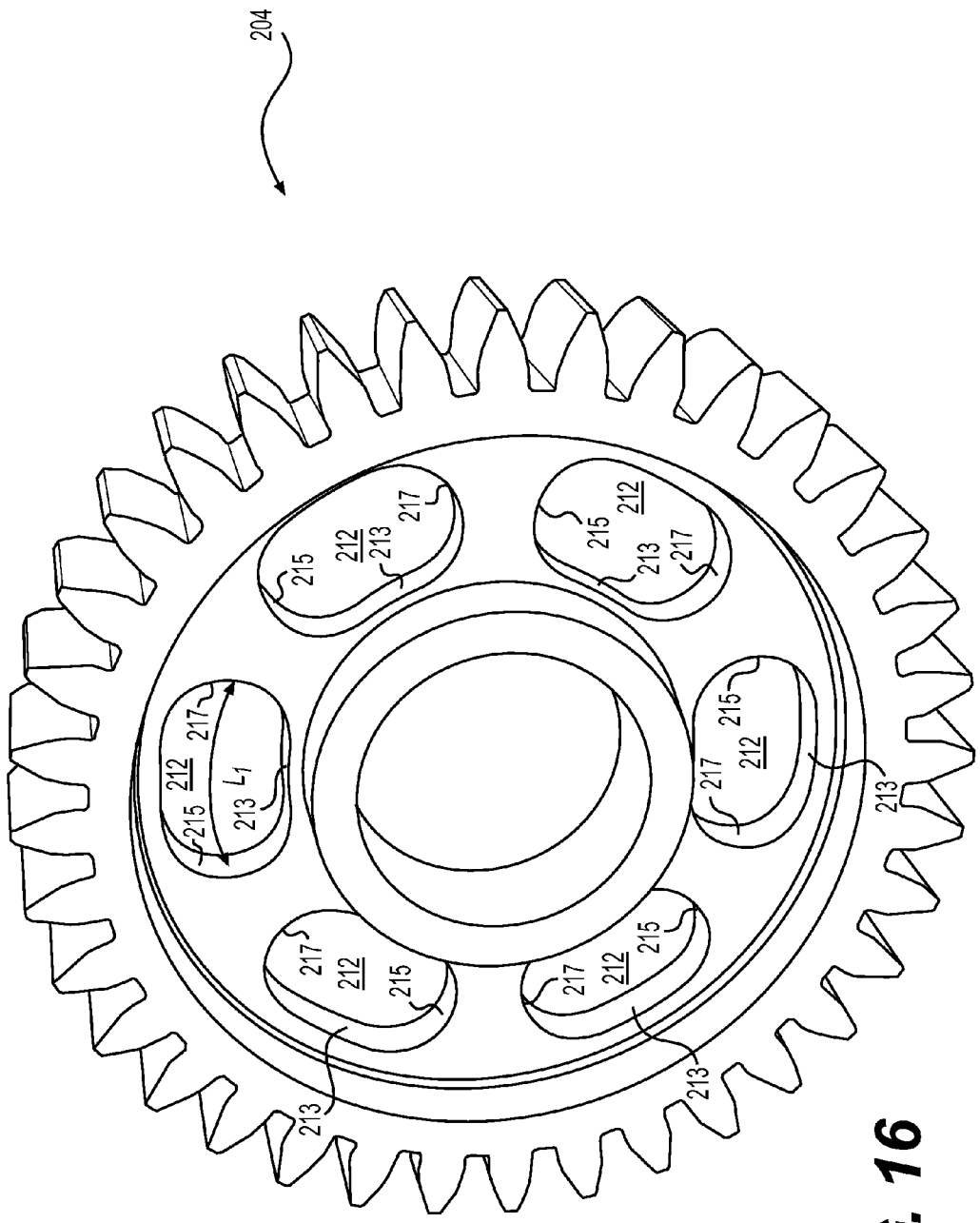
FIG. 16 is a perspective view of a transmission gear of the transmission of FIG. 3.
Figure 17A:
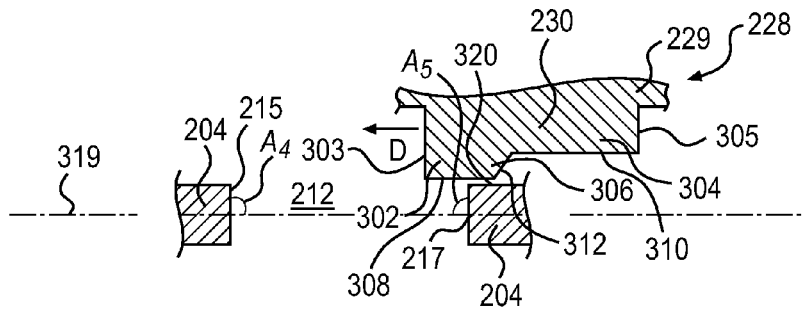
FIGS. 17A to 17D are four schematic illustrations showing a tooth of the shifting sleeve of FIG. 15A engaging an opening of the transmission gear of FIG. 16.
Figure 17B:
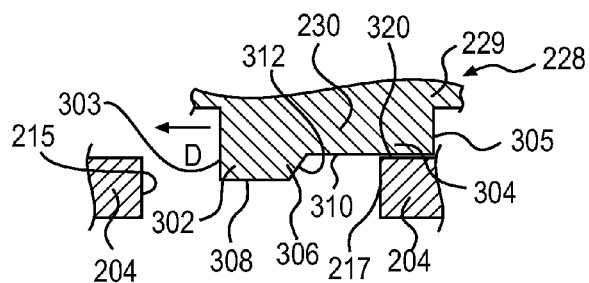
Figure 17C:
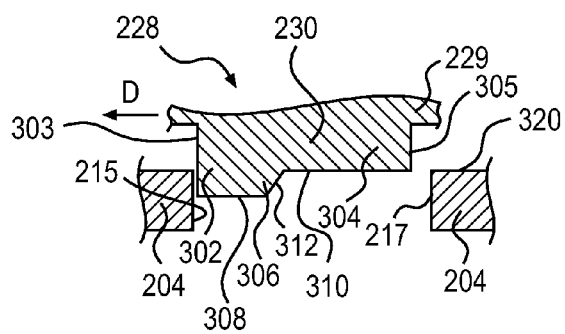
Figure 17D:
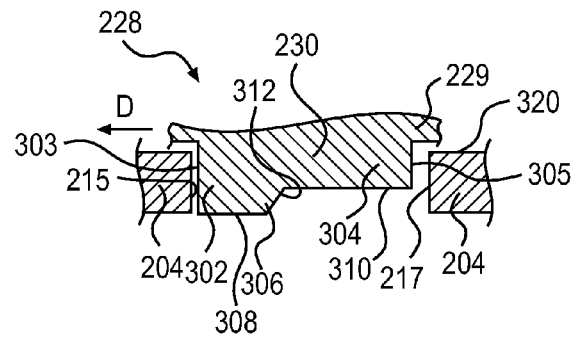

As shown in FIG. 16, the openings 212 have a first length $L_1$, and the top surface 308 of the front portion 302 of each tooth 230 has a second length $L_2$. As can be seen, the second length $L_2$ is substantially shorter than the first length $L_1$. In this particular embodiment, the second length $L_2$ is approximately 50% of first length $L_1$. It is contemplated that in other embodiments, the second length $L_2$ could be between 30% and 70% of the first length $L_1$. Furthermore, each opening 212 is defined by a wall 213 having opposite portions 215, 217 for engaging the front face 303 and the rear face 305 of a tooth 230. As shown in FIG. 17A, the two portions 215, 217 of the wall 213 define angles $A_4$ and $A_5$ with respect to a line 319 extending parallel to the body of the transmission gear 204. Angle $A_4$ and $A_5$ correspond to Angle $A_1$ and $A_2$ respectively to ensure that the front and rear faces 303, 305 of a tooth 230 tightly engage with the portions 215, 217 of the wall 213 of an opening 212. In this embodiment, the angles $A_4$ and $A_5$ are 88°. It is contemplated that in other embodiments, the angles $A_4$ and $A_5$ could be between 85° and 90°.

Turning now to FIGS. 17A to 17D, the way in which each tooth 230 of the shifting sleeve 228 engages with each opening 212 of the transmission gear 204 will be described. When the shifting sleeve 228 rotates in the direction D and is moved toward the transmission gear 204 (upon actuation of the shift fork 180), the front portion 302 of a tooth 230 first engages an opening 212, and the top surface 310 of the rear portion 304 abuts on a portion 320 of a surface of the transmission gear 204 near an edge of the opening 212 (see FIGS. 17A and 17B). Then, as the shifting sleeve 228 continues to rotate in the direction D, the front face 303 abuts on a portion of the portion 215 of the wall 213, thereby causing the transmission gear 204 to rotate with the shifting sleeve 212, and the whole body of the tooth 230 engages the opening 212 (see FIGS. 17C and 17D).

Figure 18A:
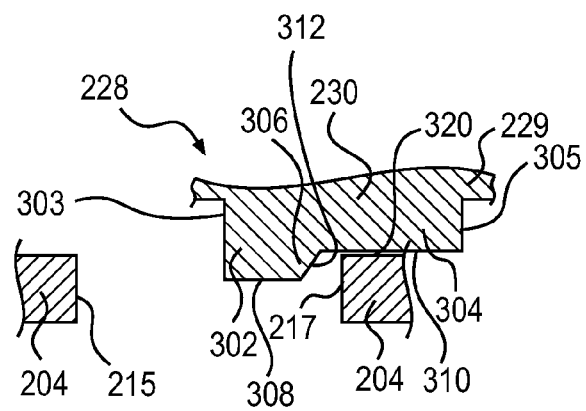
FIGS. 18A and 18B are two schematic illustrations showing a tooth of the shifting sleeve of FIG. 15A disengaging an opening of the transmission gear of FIG. 16.
Figure 18B:
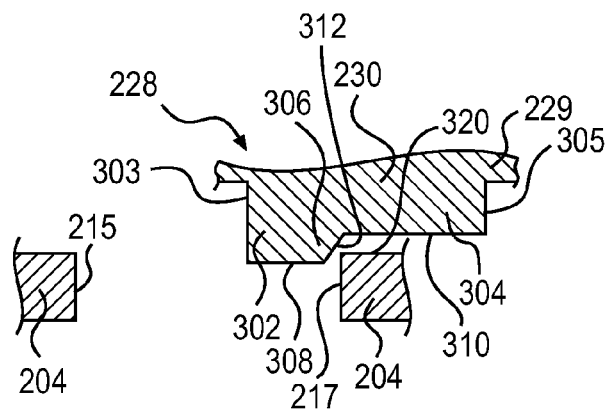

Turning now to FIGS. 18A and 18B, the way in which each tooth 230 of the shifting sleeve 228 disengages from each opening 212 of the transmission gear 204 will be described. In coasting mode or an engine braking condition, the transmission gear 204 may rotate faster than the shifting sleeve 228. In this situation it may occur that only the front portion 302 of a tooth engages the corresponding opening 212 and the surface 312 gets in contact with the portion 217 of the wall 213. It is undesirable that the tooth gets "caught" in this situation, with all rotational forces acting only upon the intermediate portion 306. In this situation the contact of the surface 312 with the portion 217 of the wall 213 forces the shifting sleeve 228 away from the transmission gear 204, thereby temporarily disengaging them.

Turning now to FIGS. 9A to 14, the arrangement of the internal components of the vehicle transmission 100 in the various shift positions of the shifting sequence and the transition from one shifting position to the other will be described.

As explained above, and as shown in FIG. 14, the vehicle transmission 100 has five shifting positions. These positions are sequentially: park (P), reverse (R), neutral (N), high (H), and low (L). The sequence can be followed in one direction or the other (i.e. P-R-N-H-L or L-H-N-R-P). Although each of the shifting positions must be selected in sequence by the gear selector 102, there is no need to go through the complete shifting sequence before returning to prior shifting positions in the sequence. For example, the operator of the ATV 10 could move the gear selector 102 to select various shifting positions in the following orders: P-R-N-H-N-R or L-H-L-H-N-R or P-R-P. As should be appreciated, many more sequences are possible.

Turning now to FIGS. 9A and 9B, a park shifting position of the vehicle transmission 100 will be described. When the park shifting position is selected by the gear selector 102, the shift shaft 118 and segment gear 128 are rotated to the position shown, which in turn rotates the shift drum shaft 138 to its park position and rotates the shift drums 154, 168 with the shift drum shaft 138. The indexing wheel 142 and the indexing lever 146 ensure that the shift drum shaft 138 and the shift drums 154, 168 are in the correct angular orientation for the park position. The shift drums 154, 168 are in their default positions. In the park position, the groove 156 of the shift drums 154 positions the pin 186 such that the shift fork 180 maintains the shifting sleeve 228 in a position where the set of teeth 230 of the shifting sleeve 228 are disengaged from the set of openings 212 of the transmission gear 204. In the park position, the groove 170 of the shift drum 168 positions the pin 182 such that the shift fork 178 moves the shifting sleeve 218 to a position where the set of teeth 220 of the shifting sleeve 218 are disengaged from the set of openings 208 of the transmission gear 200 and moves the shifting sleeve 222 to a position where the set of teeth 224 of the shifting sleeve 222 are disengaged from the set of openings 210 of the transmission gear 202. Also, the groove 170 of the shift drums 168 positions the pin 184 of the shift fork 178 is disposed adjacent to the straight portion 164 of the radially extending wall 162 of the collar 160. Since the pin 184 is disposed adjacent to the radially extending wall 162 and the shift drum 168 contacts the stopper ring 174, the shift fork 178 is prevented from sliding along the fork rod 176. Since none of the transmission gears 200, 202, 204 are engaged, the transmission shaft 196 does not rotate even though the input shaft 104 may be rotating. In the park position of the shift drum shaft 138, the parking lock lever 236 engages the transmission gear 234 as shown in FIG. 9B, thus preventing the transmission shaft 196 and therefore the output shaft 106 and the wheels 14 (and wheels 12 should the all-wheel drive mode be selected) from rotating. The parking lock lever 236 by engaging the transmission gear 234 therefore prevents the ATV 10 from moving when, for example, it is parked on a hill.

Figure 10A:
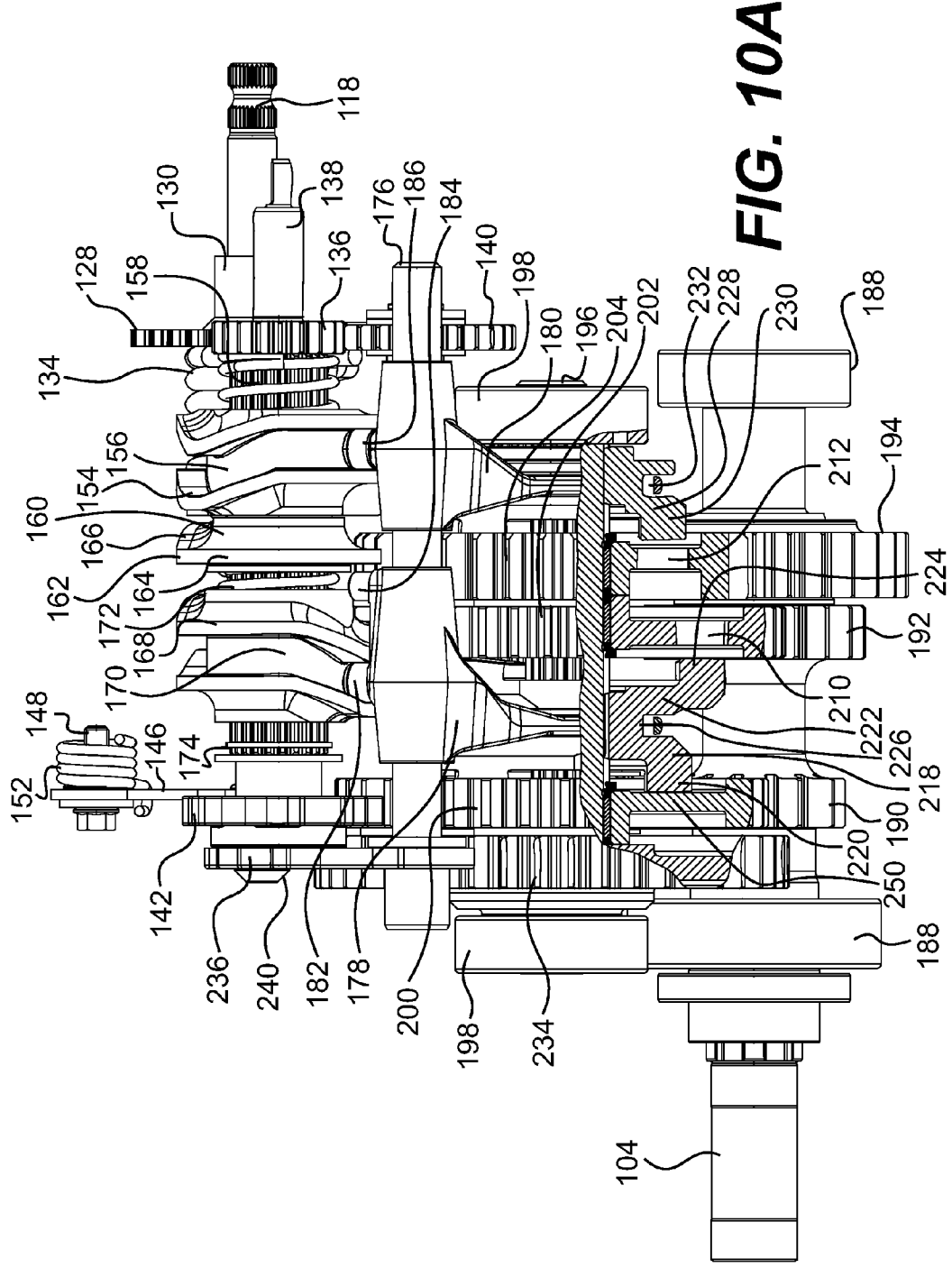
FIG. 10A is a rear perspective view of internal components of the transmission of FIG. 3 in a reverse pre-select position, with a portion thereof shown in cross-section.
Figure 10B:
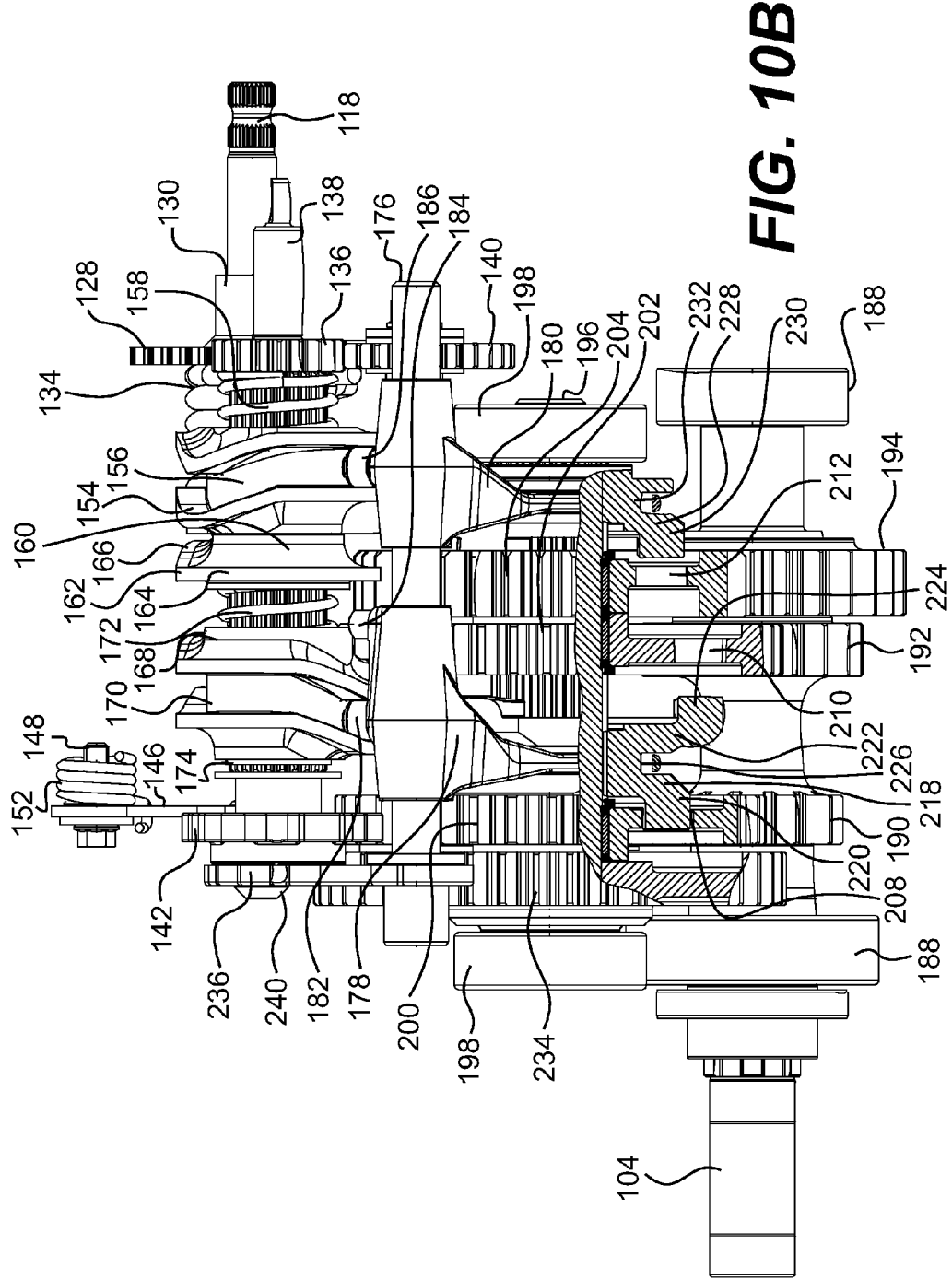
FIG. 10B is a rear perspective view of internal components of the transmission of FIG. 3 in a reverse position, with a portion thereof shown in cross-section.
Figure 10C:
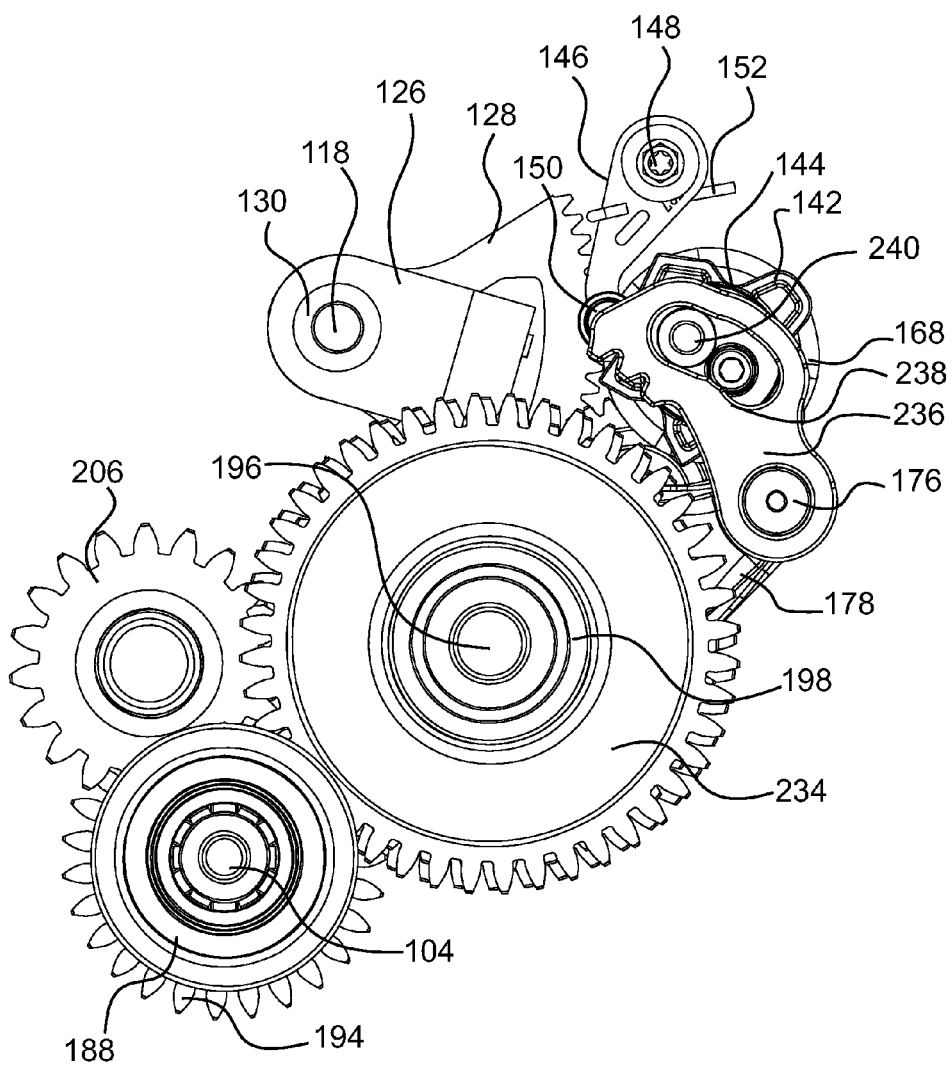
FIG. 10C is a left side elevation view of FIG. 10B.

Turning now to FIGS. 10A to 10C, a reverse shifting position of the vehicle transmission 100 will be described. When the reverse shifting position is selected by the gear selector 102, the shift shaft 118 and segment gear 128 are rotated to the position shown, which in turn rotates the shift drum shaft 138 to its reverse position and rotates the shift drums 154, 168 with the shift drum shaft 138. The indexing wheel 142 and the indexing lever 146 ensure that the shift drum shaft 138 and the shift drums 154, 168 are in the correct angular orientation for the reverse position. The shift drum 154 is in its default position. In the reverse position, the groove 156 of the shift drums 154 positions the pin 186 such that the shift fork 180 maintains the shifting sleeve 228 in a position where the set of teeth 230 of the shifting sleeve 228 are disengaged from the set of openings 212 of the transmission gear 204. In the reverse position, the groove 170 of the shift drums 168 positions the pin 182 such that the shift fork 178 moves the shifting sleeve 218 toward a position where the set of teeth 220 of the shifting sleeve 218 are to be engaged with the set of openings 208 of the transmission gear 200 and moves the shifting sleeve 222 to a position where the set of teeth 224 of the shifting sleeve 222 are disengaged from the set of openings 210 of the transmission gear 202. There is a possibility that the set of teeth 220 of the shifting sleeve 218 are misaligned with the set of openings 208 of the transmission gear 200 and as such cannot engage them. In the event that this occurs, the set of teeth 220 of the shifting sleeve 218 come into contact with portions 250 of the transmission gear 200 located between the openings 208 as shown in FIG. 10A. As also shown in FIG. 10A, as a result of the teeth 220 coming into contact with the portions 250, the shift drum 168 moves on the shift drum shaft 138 toward the collar 160, thereby compressing the spring 172. This position of the shift drum 168 will be referred to herein as the pre-select position of the shift drum 168. As the transmission gear 200 continues to rotate, the teeth 220 of the shifting sleeve 218 are eventually aligned with the openings 208 of the transmission gear 200 and the spring 172 biases the shift drum 168 back to its default position, which also moves the shift fork 178 and shifting sleeve 218 toward the transmission gear 200 such that the teeth 220 of the shifting sleeve 218 engage the openings 208 of the transmission gear 200 as shown in FIG. 10B. Should the teeth 220 of the shifting sleeve 218 be aligned with the openings 208 of the transmission gear 200 when the gear selector 102 and shift drum shaft 138 are moved to their reverse positions, the shift drum 168 remains in its default position and the teeth 220 of the shifting sleeve 218 are engaged with the openings 208 of the transmission gear 200 as shown in FIG. 10B. In the reverse position of the shift drum shaft 138, the parking lock lever 236 is disengaged from the transmission gear 234 as shown in FIG. 10C. Once the teeth 220 of the shifting sleeve 218 are engaged with the openings 208 of the transmission gear 200, the rotational motion of the transmission gear 200 is transferred to the transmission shaft 196 and, as described above, to the output shaft 106, the wheels 14, and, should the all-wheel drive mode be selected, the wheels 12. When the reverse shifting position is selected, the ATV 10 moves rearwardly.

By having the shift drum 168 move to its pre-select position, the shift drum shaft 138 and the gear selector 102 can be moved to their positions corresponding to the reverse shifting position of the vehicle transmission 100 even though the transmission gear 200 has not been engaged by the shifting sleeve 218, compared with at least some prior art transmissions where the shifting drum shaft and gear selector cannot be moved to their reverse shifting positions until the corresponding transmission gear is engaged by its corresponding shifting sleeve. Having the shift drum 168 move to the pre-select position also permits the gear selector 102 and the shifting drum shaft 138, along with the other internal components of the vehicle transmission 100, to be moved to the next position in the shifting sequence (i.e. park or neutral) even if the transmission gear 200 has not yet been engaged by the shifting sleeve 218.

Figure 11A:
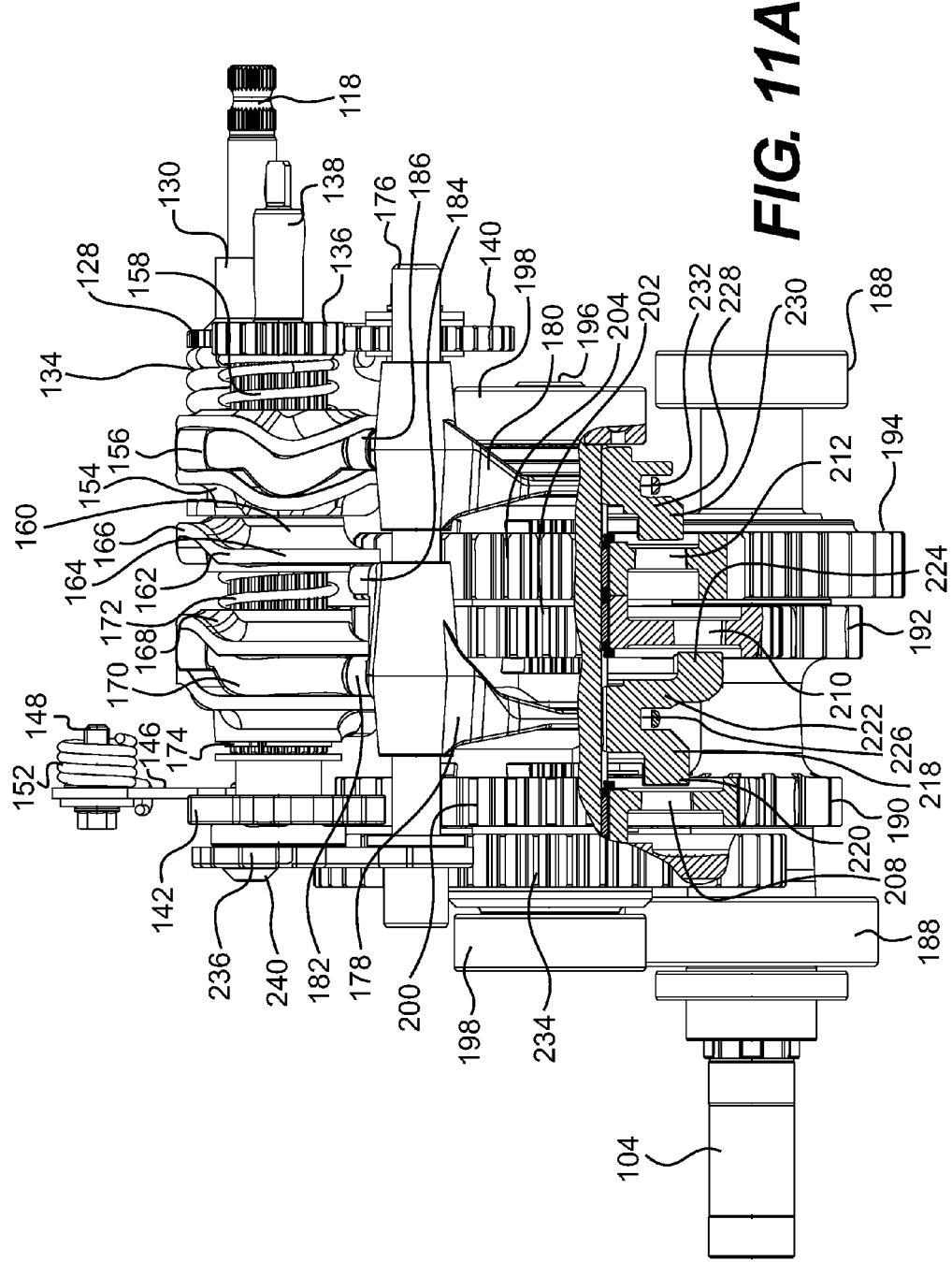
FIG. 11A is a rear perspective view of internal components of the transmission of FIG. 3 in a neutral position, with a portion thereof shown in cross-section.
Figure 11B:
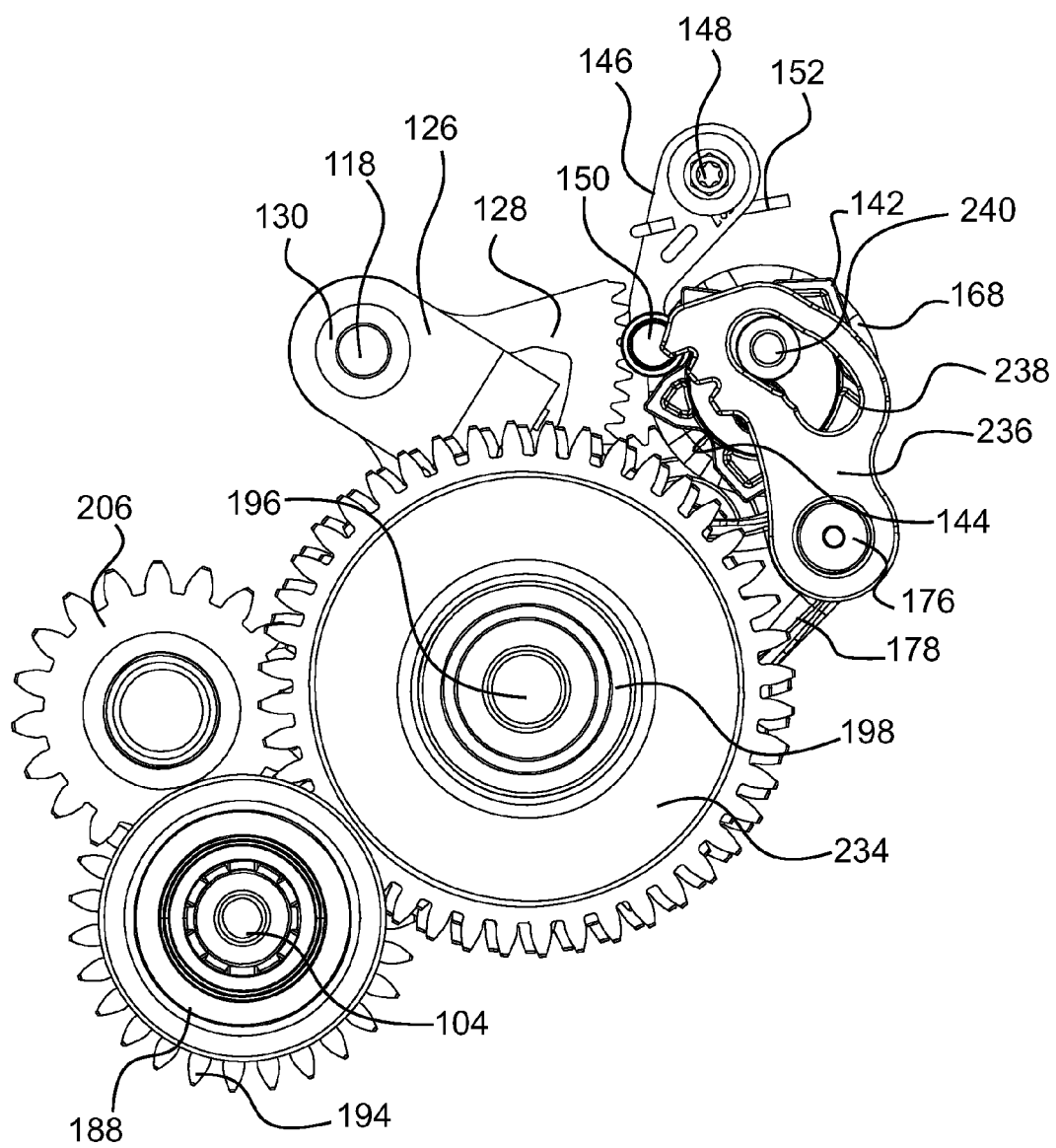
FIG. 11B is a left side elevation view of FIG. 11A.

Turning now to FIGS. 11A and 11B, a neutral shifting position of the vehicle transmission 100 will be described. When the neutral shifting position is selected by the gear selector 102, the shift shaft 118 and segment gear 128 are rotated to the position shown, which in turn rotates the shift drum shaft 138 to its neutral position and rotates the shift drums 154, 168 with the shift drum shaft 138. The indexing wheel 142 and the indexing lever 146 ensure that the shift drum shaft 138 and the shift drums 154, 168 are in the correct angular orientation for the neutral position. The shift drums 154, 168 are in their default positions. In the neutral position, the groove 156 of the shift drums 154 positions the pin 186 such that the shift fork 180 moves the shifting sleeve 228 to a position where the set of teeth 230 of the shifting sleeve 228 are disengaged from the set of openings 212 of the transmission gear 204. In the neutral position, the groove 170 of the shift drums 168 positions the pin 182 such that the shift fork 178 moves the shifting sleeve 218 to a position where the set of teeth 220 of the shifting sleeve 218 are disengaged from the set of openings 208 of the transmission gear 200 and moves the shifting sleeve 222 to a position where the set of teeth 224 of the shifting sleeve 222 are disengaged from the set of openings 210 of the transmission gear 202. Also, the groove 170 of the shift drums 168 positions the pin 182 such that the pin 184 of the shift fork 178 is disposed adjacent to the straight portion 164 of the radially extending wall 162 of the collar 160. Since the pin 184 is disposed adjacent to the radially extending wall 162 and the shift drum 168 contacts the stopper ring 174, the shift fork 178 is prevented from sliding along the fork rod 176. Since none of the transmission gears 200, 202, 204 are engaged, the transmission shaft 196 does not rotate even though the input shaft 104 is rotating. In the neutral position of the shift drum shaft 138, the parking lock lever 236 is disengaged from the transmission gear 234 as shown if FIG. 11B.

Figure 12A:
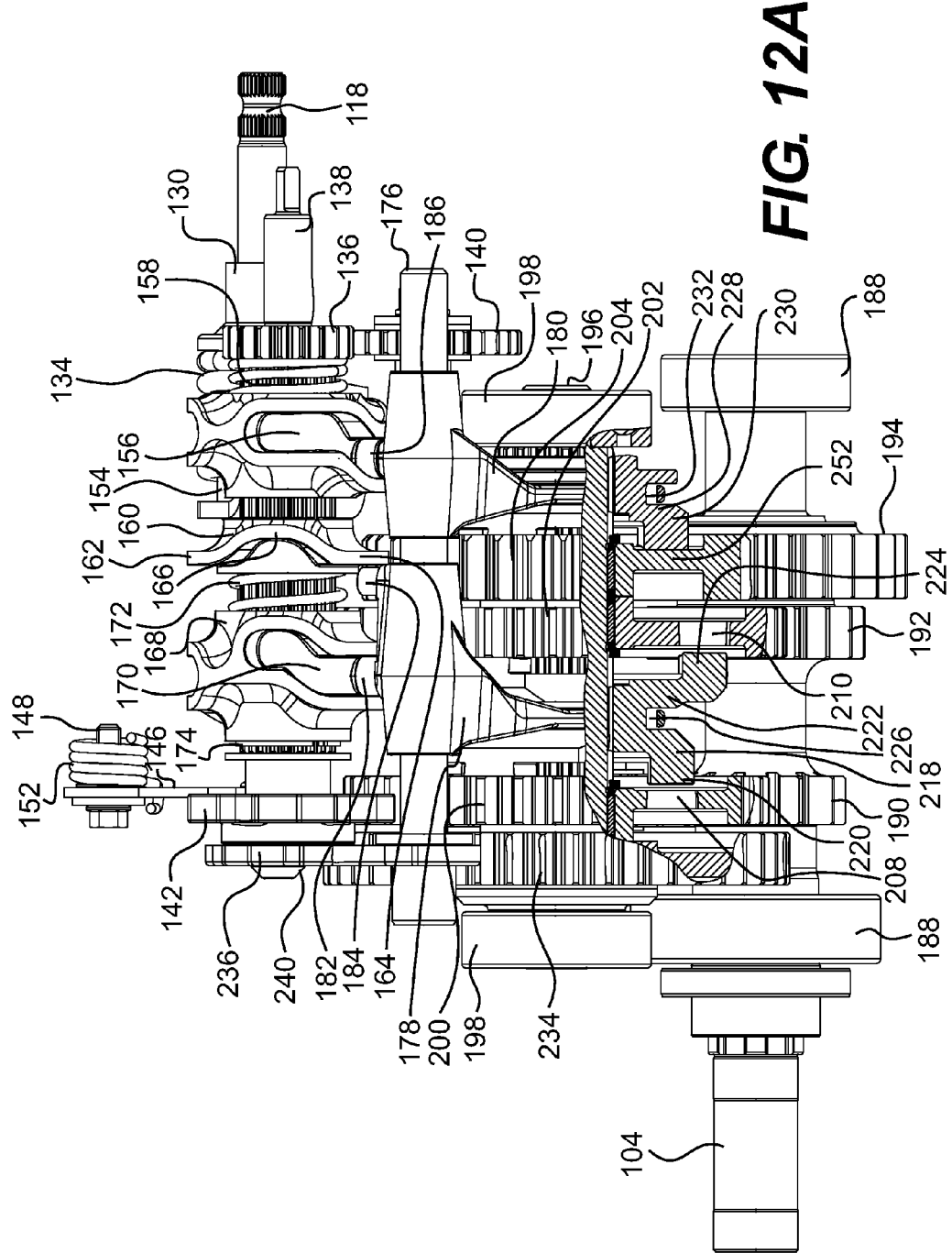
FIG. 12A is a rear perspective view of internal components of the transmission of FIG. 3 in a high pre-select position, with a portion thereof shown in cross-section.
Figure 12B:
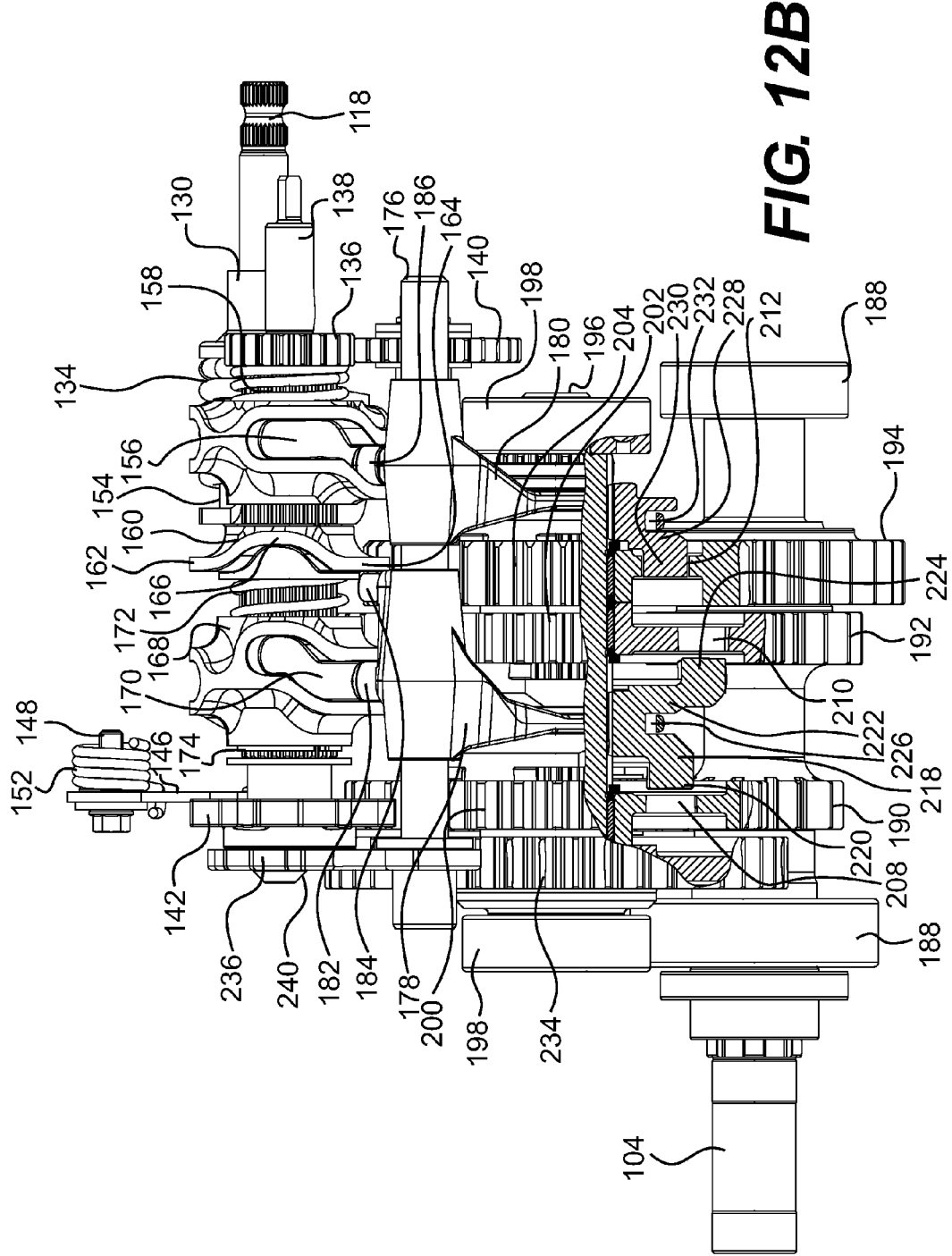
FIG. 12B is a rear perspective view of internal components of the transmission of FIG. 3 in a high position, with a portion thereof shown in cross-section.
Figure 12C:
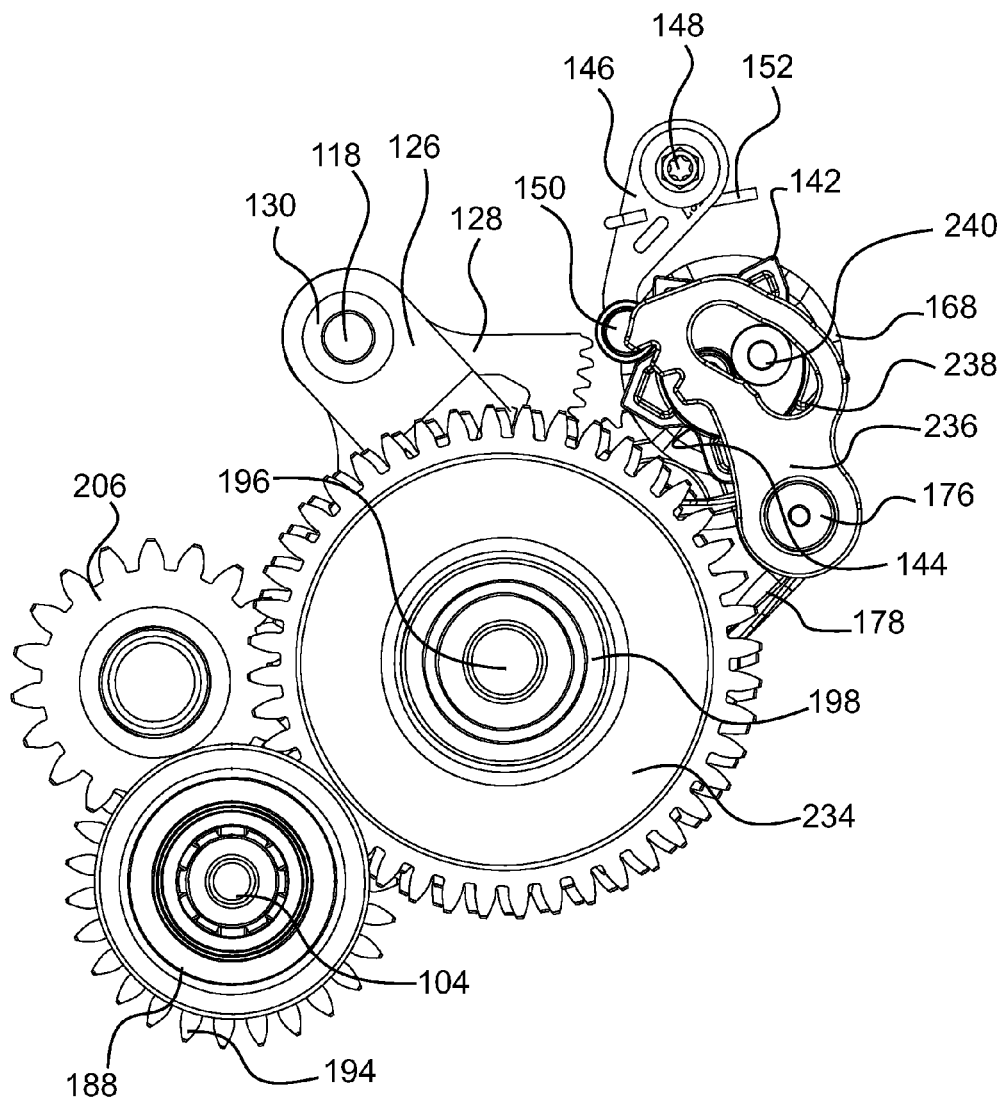
FIG. 12C is a left side elevation view of FIG. 12B.

Turning now to FIGS. 12A to 12C, a high shifting position of the vehicle transmission 100 will be described. When the high shifting position is selected by the gear selector 102, the shift shaft 118 and segment gear 128 are rotated to the position shown, which in turn rotates the shift drum shaft 138 to its high position and rotates the shift drums 154, 168 with the shift drum shaft 138. The indexing wheel 142 and the indexing lever 146 ensure that the shift drum shaft 138 and the shift drums 154, 168 are in the correct angular orientation for the high position. The shift drum 168 is in its default position. In the high position, the groove 170 of the shift drums 168 positions the pin 182 such that the shift fork 178 moves the shifting sleeve 218 to a position where the set of teeth 220 of the shifting sleeve 218 are disengaged from the set of openings 208 of the transmission gear 200 and moves the shifting sleeve 222 to a position where the set of teeth 224 of the shifting sleeve 222 are disengaged from the set of openings 210 of the transmission gear 202. Also, the groove 170 of the shift drums 168 positions the pin 182 such that the pin 184 of the shift fork 178 is disposed adjacent to the straight portion 164 of the radially extending wall 162 of the collar 160. Since the pin 184 is disposed adjacent to the radially extending wall 162 and the shift drum 168 contacts the stopper ring 174, the shift fork 178 is prevented from sliding along the fork rod 176. In the high position, the groove 156 of the shift drums 154 positions the pin 186 such that the shift fork 180 moves the shifting sleeve 228 toward a position where the set of teeth 230 of the shifting sleeve 228 are to be engaged with the set of openings 212 of the transmission gear 204. There is a possibility that the set of teeth 230 of the shifting sleeve 228 are misaligned with the set of openings 212 of the transmission gear 204 and as such cannot engage them. In the event that this occurs, the set of teeth 230 of the shifting sleeve 228 come into contact with portions 252 of the transmission gear 204 located between the openings 212 as shown in FIG. 12A. As also shown in FIG. 12A, as a result of the teeth 230 coming into contact with the portions 252, the shift drum 154 moves on the shift drum shaft 138 toward the drive gear 136, thereby compressing the spring 158. This position of the shift drum 154 will be referred to herein as the pre-select position of the shift drum 154. As the transmission gear 204 continues to rotate, the teeth 230 of the shifting sleeve 228 are eventually aligned with the openings 212 of the transmission gear 204 and the spring 158 biases the shift drum 154 back to its default position, which also moves the shift fork 180 and shifting sleeve 228 toward the transmission gear 204 such that the teeth 230 of the shifting sleeve 228 engage the openings 212 of the transmission gear 204 as shown in FIG. 12B. Should the teeth 230 of the shifting sleeve 228 be aligned with the openings 212 of the transmission gear 204 when the gear selector 102 and shift drum shaft 138 are moved to their high positions, the shift drum 154 remains in its default position and the teeth 230 of the shifting sleeve 228 are engaged with the openings 212 of the transmission gear 204 as shown in FIG. 12B. In the high position of the shift drum shaft 138, the parking lock lever 236 is disengaged from the transmission gear 234 as shown in FIG. 12C. Once the teeth 230 of the shifting sleeve 228 are engaged with the openings 212 of the transmission gear 204, the rotational motion of the transmission gear 204 is transferred to the transmission shaft 196 and, as described above, to the output shaft 106, the wheels 14, and, should the all-wheel drive mode be selected, the wheels 12. When the high shifting position is selected, the ATV 10 moves forwardly.

By having the shift drum 154 move to its pre-select position, the shift drum shaft 138 and the gear selector 102 can be moved to their positions corresponding to the high shifting position of the vehicle transmission 100 even though the transmission gear 204 has not been engaged by the shifting sleeve 228, compared with at least some prior art transmissions where the shifting drum shaft and gear selector cannot be moved to their high shifting positions until the corresponding transmission gear is engaged by its corresponding shifting sleeve. Having the shift drum 154 move to the pre-select position also permits the gear selector 102 and the shifting drum shaft 138, along with the other internal components of the vehicle transmission 100, to be moved to the next position in the shifting sequence (i.e. neutral or low) even if the transmission gear 204 has not yet been engaged by the shifting sleeve 228.

Figure 13A:
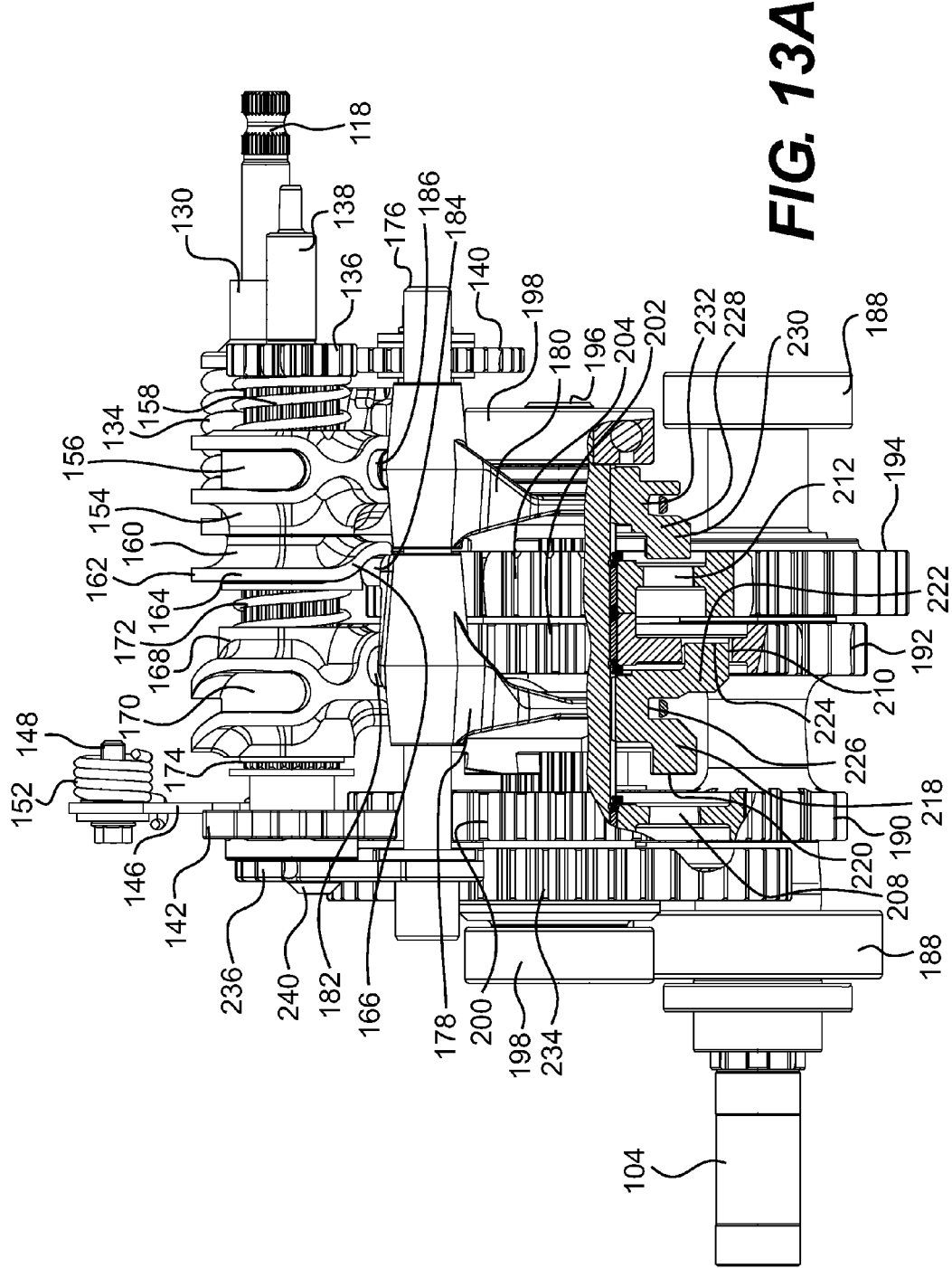
FIG. 13A is a rear perspective view of internal components of the transmission of FIG. 3 in a low position, with a portion thereof shown in cross-section.
Figure 13B:
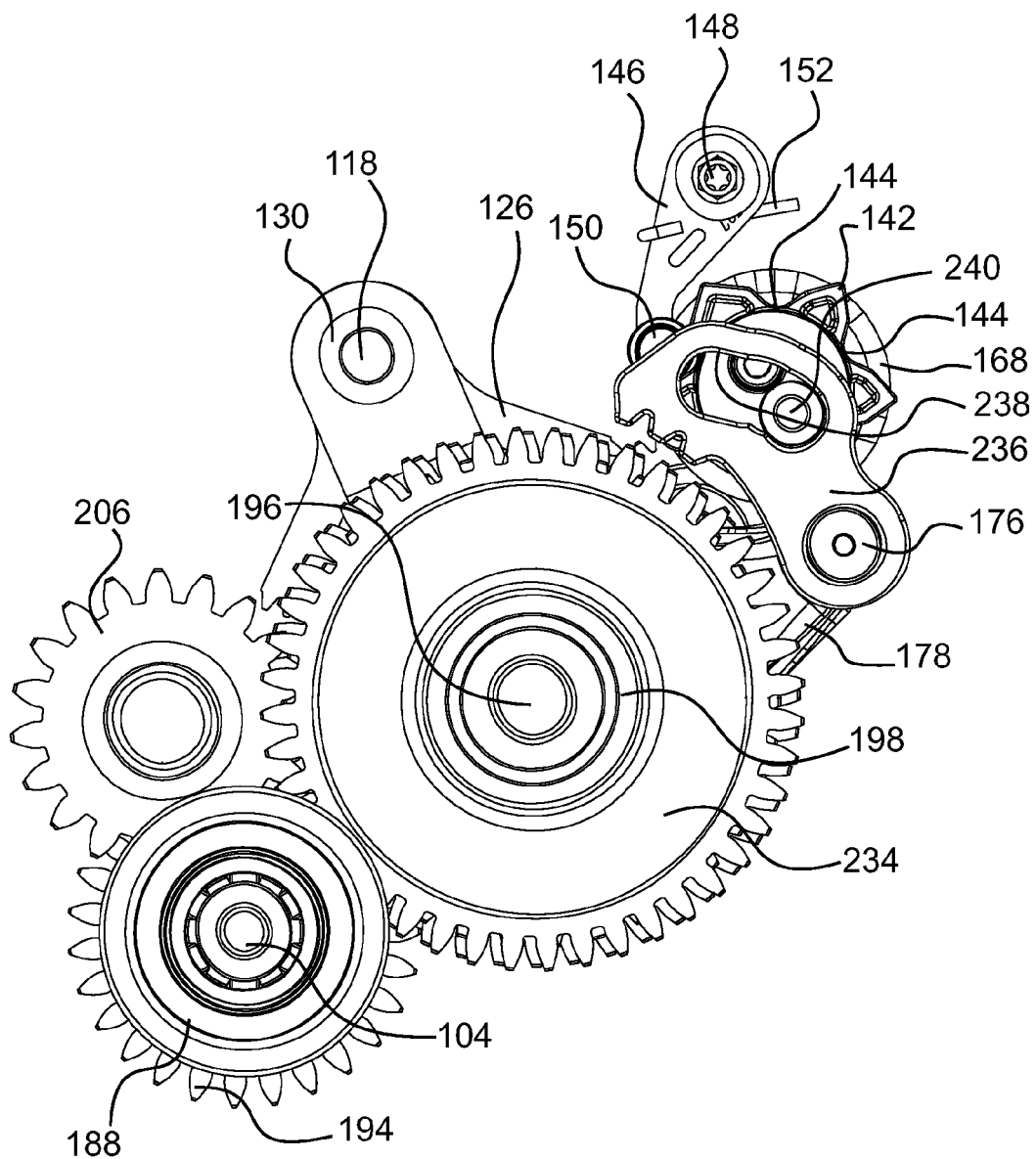
FIG. 13B is a left side elevation view of FIG. 13A.

Turning now to FIGS. 13A and 13B, a low shifting position of the vehicle transmission 100 will be described. When the low shifting position is selected by the gear selector 102, the shift shaft 118 is rotated. As the shifting drum shaft 138 is being rotated to its low position by the segment gear 128, the shift drum 168 is in its default position, and the groove 170 of the shift drums 168 positions the pin 182 such that the shift fork 178 moves the shifting sleeve 222 toward a position where the set of teeth 224 of the shifting sleeve 222 are to be engaged with the set of openings 210 of the transmission gear 202 and moves the shifting sleeve 218 to a position where the set of teeth 220 of the shifting sleeve 218 are disengaged from the set of openings 208 of the transmission gear 200. There is a possibility that the set of teeth 224 of the shifting sleeve 222 are misaligned with the set of openings 210 of the transmission gear 202 and as such cannot engage them. In the event that this occurs, the set of teeth 224 of the shifting sleeve 222 come into contact with portions (not shown) of the transmission gear 202 located between the openings 210. As a result of the teeth 224 coming into contact with the portions of the transmission gear 202 located between the openings 210, the shift drum shaft 138 is prevented from rotating to its low position. Even though the shift drum shaft 138 is prevented from rotating further, the shifting assembly 118 allows the shift shaft 118 to continue to rotate, and since the segment gear 128 cannot rotate, the spring 134 stores energy. As the transmission gear 202 continues to rotate, the teeth 224 of the shifting sleeve 222 are eventually aligned with the openings 210 of the transmission gear 200 and the spring 134 releases its energy, thereby moving the segment gear 128 to the position shown in FIG. 13B, which moves the shift drum shaft 138 to its low position, which also moves the shift fork 178 and shifting sleeve 222 toward the transmission gear 204 such that the teeth 224 of the shifting sleeve 222 engage the openings 210 of the transmission gear 202 as shown in FIG. 13A. Should the teeth 224 of the shifting sleeve 222 be aligned with the openings 210 of the transmission gear 204 when the gear selector 102 is moved to its low shifting position, the shift drum shaft 138 is moved to its low position, the teeth 224 of the shifting sleeve 222 are engaged with the openings 210 of the transmission gear 204 as shown in FIG. 13A. Also, the groove 170 of the shift drums 168 positions the pin 182 such that the pin 184 of the shift fork 178 is disposed adjacent to the recessed portion 166 of the radially extending wall 162 of the collar 160. The indexing wheel 142 and the indexing lever 146 ensure that the shift drum shaft 138 and the shift drums 154, 168 are in the correct angular orientation for the low position. The shift drum 154 is in its default position. In the low position, the groove 156 of the shift drums 154 positions the pin 186 such that the shift fork 180 moves the shifting sleeve 228 in a position where the set of teeth 230 of the shifting sleeve 228 are disengaged from the set of openings 212 of the transmission gear 204. In the low position of the shift drum shaft 138, the parking lock lever 236 is disengaged from the transmission gear 234 as shown in FIG. 13B. Once the teeth 224 of the shifting sleeve 222 are engaged with the openings 210 of the transmission gear 202, the rotational motion of the transmission gear 202 is transferred to the transmission shaft 196 and, as described above, to the output shaft 106, the wheels 14, and, should the all-wheel drive mode be selected, the wheels 12. When the low shifting position is selected, the ATV 10 moves forwardly, but at a lower speed than in the high shifting position for an identical speed of rotation of the input shaft 104. However, the low shifting position provides more torque than the high shifting positions for an identical speed of rotation of the input shaft 104.

When the high shifting position of the vehicle transmission 100 is selected after having selected the low shifting position, the recessed portion 166 of the radially extending wall 162 of the collar 160 comes into contact with the pin 184 and pushes the shift fork 178 away from the transmission gear 202 as the shift drum shaft 138 rotates, thus helping in disengaging the shifting sleeve 222 from the transmission gear 202.

It is contemplated that the shift drum 168 and associated components could be arranged such that the shift drum 168 would move to a pre-select position when the low shifting position is selected and the teeth 224 come into contact with the portions of the transmission gear 202 located between the openings 210, as is the case when selecting the high or reverse shifting positions.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A shifting sleeve for selectively engaging at least one transmission gear in a vehicle transmission, the at least one transmission gear having at least one opening defined therein, the shifting sleeve comprising:
   a shifting sleeve body having two opposite faces; and
   at least one tooth for selectively engaging the at least one opening defined in the at least one transmission gear, the at least one tooth extending from one of the two faces, the at least one tooth having a first portion, a second portion and a third portion,
      the first portion having a top surface disposed at a first height relative to the one of the two faces,
      the second portion having a top surface disposed at a second height relative to the one of the two faces, the first height being greater than the second height, and
      the third portion being disposed between the first and second portions, and having a top surface disposed at an angle relative to the one of the two faces and extending between the top surface of the first portion and the top surface of the second portion.

2. The shifting sleeve of claim 1, wherein:
   the first portion of the at least one tooth is a front portion with respect to a rotation direction of the shifting sleeve; and
   the second portion of the at least one tooth is a rear portion with respect to the rotation direction.

3. The shifting sleeve of claim 1, wherein:
   the second height is between 55% and 80% of the first height.

4. The shifting sleeve of claim 2, wherein the at least one opening defined in the at least one transmission gear has a first length, wherein:
   the front portion has a second length; and
   the second length is between 30% and 70% of the first length.

5. The shifting sleeve of claim 1, wherein:
   the angle between the top surface of the third portion and the one of the two faces is between 30° and 60°.

6. The shifting sleeve of claim 1, wherein:
   the top surfaces of the first and second portions are generally flat.

7. The shifting sleeve of claim 6, wherein:
   the top surface of the third portion of the at least one tooth is arcuate.

8. The shifting sleeve of claim 6, wherein:
the top surfaces of the first and second portions extend generally parallel to the one of the two faces.

9. The shifting sleeve of claim 1, wherein:
the at least one tooth is integrally formed with the shifting sleeve.

10. A vehicle transmission comprising:
a first shaft;
at least one first gear connected to the first shaft and rotating therewith;
a second shaft disposed parallel to the first shaft;
at least one second gear rotatably connected to the second shaft such that the second shaft can rotate independently of the at least one second gear, the at least one second gear operatively engaging the at least one first gear;
at least one shifting sleeve disposed on the second shaft near the at least one first gear, the at least one shifting sleeve being rotatably fixed to the second shaft for rotation therewith, the at least one shifting sleeve being movable axially with respect to the second shaft,
the at least one shifting sleeve having a face facing the at least one second gear and at least one tooth for selectively engaging at least one opening defined in the at least one second gear, the at least one tooth extending from the face,
the at least one tooth having a first portion, a second portion and a third portion,
the first portion having a top surface disposed at a first height relative to the face,
the second portion having a top surface disposed at a second height relative to the face, the first height being greater than the second height, and
the third portion being disposed between the first and second portions, and having a top surface disposed at an angle relative to the face and extending between the top surface of the first portion and the top surface of the second portion;
a fork rod disposed parallel to the second shaft; and
at least one shift fork slidably disposed on the fork rod, the at least one shift fork extending toward the at least one shifting sleeve and engaging the at least one shifting sleeve.

11. The vehicle transmission of claim 10, wherein:
the first shaft is an input shaft;
the at least one first gear is at least one input gear;
the second shaft is a transmission shaft, and the input shaft selectively drives the transmission shaft; and
the at least one second gear is at least one transmission gear;
the vehicle transmission further comprising an output shaft operatively connected to the transmission shaft, and the transmission shaft drives the output shaft.

12. The vehicle transmission of claim 10, wherein:
the first portion of the at least one tooth is a front portion with respect to a rotation direction of the shifting sleeve; and
the second portion of the at least one tooth is a rear portion with respect to the rotation direction.

13. The vehicle transmission of claim 10, wherein:
the second height is between 55% and 80% of the first height.

14. The vehicle transmission of claim 12, wherein:
the at least one opening defined in the at least one second gear has a first length;
the front portion has a second length; and
the second length is between 30% and 70% of the first length.

15. The vehicle transmission of claim 10, wherein:
the angle between the top surface of the third portion and the face is between 30° and 60°.

16. The vehicle transmission of claim 10, wherein:
the top surfaces of the first and second portions of the at least one tooth are generally flat.

17. The vehicle transmission of claim 16, wherein:
the top surface of the third portion of the at least one tooth is arcuate.

18. The vehicle transmission of claim 16, wherein:
the top surfaces of the first and second portions extend generally parallel to the face.

19. The vehicle transmission of claim 10, wherein:
the at least one tooth is integrally formed with the at least one shifting sleeve.

* * * * *